United States Patent
Nishijima et al.

(10) Patent No.: US 10,480,383 B2
(45) Date of Patent: Nov. 19, 2019

(54) ABNORMALITY DIAGNOSIS APPARATUS FOR EXHAUST GAS PURIFICATION APPARATUS

(71) Applicant: TOYOTA JIDOSHA KABUSHIKI KAISHA, Toyota-shi, Aichi-ken (JP)

(72) Inventors: Hirokazu Nishijima, Ebina (JP); Toru Kidokoro, Hadano (JP); Kazuya Takaoka, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 59 days.

(21) Appl. No.: 15/935,962

(22) Filed: Mar. 26, 2018

(65) Prior Publication Data

US 2018/0274427 A1    Sep. 27, 2018

(30) Foreign Application Priority Data

Mar. 27, 2017   (JP) .................................. 2017-060690

(51) Int. Cl.
*F01N 11/00*    (2006.01)
*F01N 3/08*     (2006.01)
(Continued)

(52) U.S. Cl.
CPC .......... *F01N 11/00* (2013.01); *B01D 53/9422* (2013.01); *B01D 53/9495* (2013.01);
(Continued)

(58) Field of Classification Search
CPC .... F01N 3/0814; F01N 3/0842; F01N 3/0871; F01N 3/2033; F01N 9/00; F01N 11/00;
(Continued)

(56) References Cited

U.S. PATENT DOCUMENTS

2008/0289318 A1* 11/2008 Elwart ................. F01N 3/0814
                                                            60/274
2009/0165440 A1   7/2009 Sawada et al.
(Continued)

FOREIGN PATENT DOCUMENTS

JP    2007-162468    6/2007
JP    2008-64075     3/2008
(Continued)

OTHER PUBLICATIONS

U.S. Appl. No. 15/897,470, filed Feb. 15, 2018.

*Primary Examiner* — Audrey K Bradley
(74) *Attorney, Agent, or Firm* — Finnegan, Henderson, Farabow, Garrett & Dunner, LLP

(57) ABSTRACT

There is provided a technology pertaining to abnormality diagnosis of an NSR catalyst that enables the diagnosis that the NSR catalyst is abnormal to be made even when the degree of deterioration of the NSR catalyst is relatively small yet. An abnormality diagnosis apparatus is applied to an exhaust gas purification apparatus having an NSR catalyst and a fuel addition valve. The abnormality diagnosis apparatus includes a controller configured to perform a specific fuel addition process and diagnose the NSR catalyst. The controller starts the specific fuel addition process when the NSR catalyst is in a specific start condition, and diagnoses the NSR catalyst on the basis of the quantity of NOx flowing out of the NSR catalyst over a specific period in the period from when the specific fuel addition process is started to when the temperature of the NSR catalyst reaches the thermal desorption temperature.

8 Claims, 12 Drawing Sheets

(51) Int. Cl.
*F01N 9/00* (2006.01)
*F02D 41/02* (2006.01)
*F02D 41/22* (2006.01)
*B01D 53/94* (2006.01)
*F01N 3/20* (2006.01)
*F02D 41/14* (2006.01)

(52) U.S. Cl.
CPC ......... *F01N 3/0814* (2013.01); *F01N 3/0842* (2013.01); *F01N 3/0871* (2013.01); *F01N 3/2033* (2013.01); *F01N 9/00* (2013.01); *F02D 41/025* (2013.01); *F02D 41/1456* (2013.01); *F02D 41/1463* (2013.01); *F02D 41/22* (2013.01); *B01D 2255/1021* (2013.01); *B01D 2255/91* (2013.01); *F01N 2430/06* (2013.01); *F01N 2550/03* (2013.01); *F01N 2560/025* (2013.01); *F01N 2560/026* (2013.01); *F01N 2560/06* (2013.01); *F01N 2570/14* (2013.01); *F01N 2610/03* (2013.01); *F01N 2610/146* (2013.01); *F01N 2900/0418* (2013.01); *F01N 2900/0422* (2013.01); *F01N 2900/1402* (2013.01); *F01N 2900/1602* (2013.01); *F01N 2900/1614* (2013.01); *F01N 2900/1812* (2013.01); *F02D 41/0275* (2013.01); *F02D 2200/0806* (2013.01); *F02D 2200/0808* (2013.01); *Y02A 50/2344* (2018.01); *Y02T 10/26* (2013.01); *Y02T 10/40* (2013.01); *Y02T 10/47* (2013.01)

(58) Field of Classification Search
CPC ............. F01N 2430/06; F01N 2550/03; F01N 2560/025; F01N 2560/026; F01N 2560/06; F01N 2570/14; F01N 2610/03; F01N 2610/146; F01N 2900/0418; F01N 2900/0422; F01N 2900/1402; F01N 2900/1602; F01N 2900/1614; F01N 2900/1812; F02D 41/025; F02D 41/0275; F02D 41/1463; F02D 41/22; F02D 2200/0806; F02D 2200/0808; B01D 53/9422; B01D 53/9495; B01D 2255/91; B01D 2255/1021
See application file for complete search history.

(56) References Cited

U.S. PATENT DOCUMENTS

2011/0265461 A1* 11/2011 Shibata .................. F01N 3/208
60/287
2016/0061087 A1  3/2016 Nagaoka

FOREIGN PATENT DOCUMENTS

| JP | 2008-255965 | 10/2008 |
| JP | 2014-202126 | 10/2014 |

* cited by examiner

[FIG. 1]
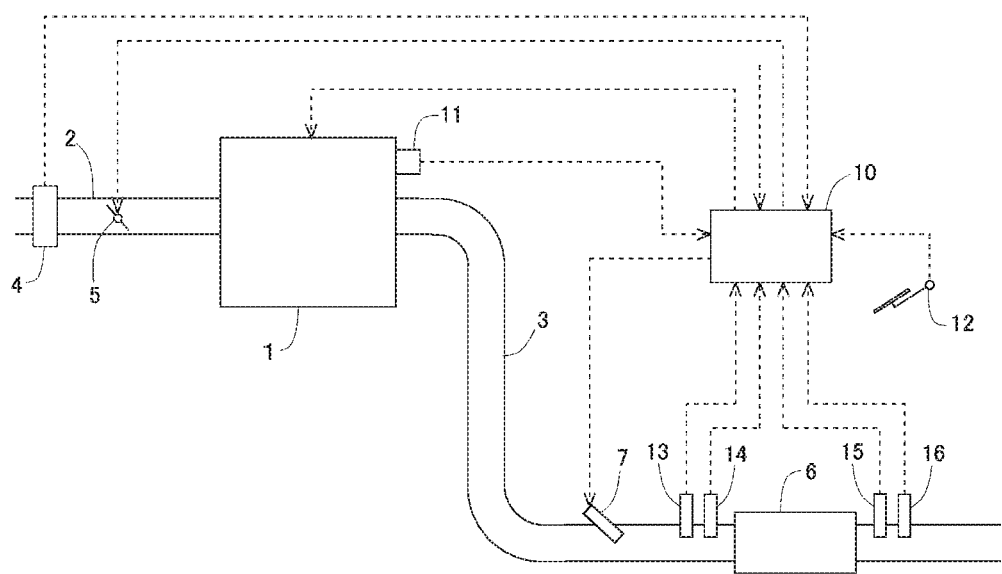

[FIG. 2]
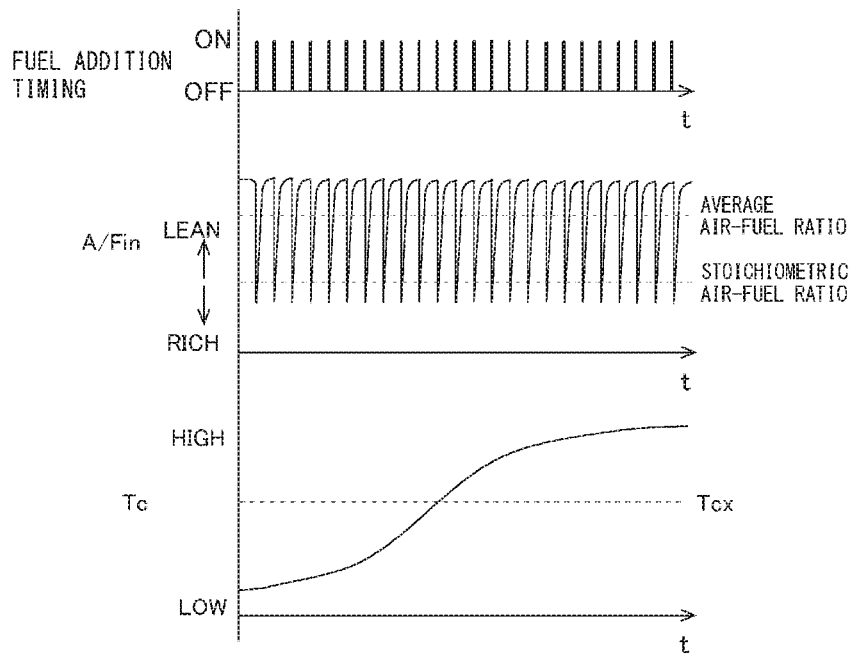
[FIG. 3]
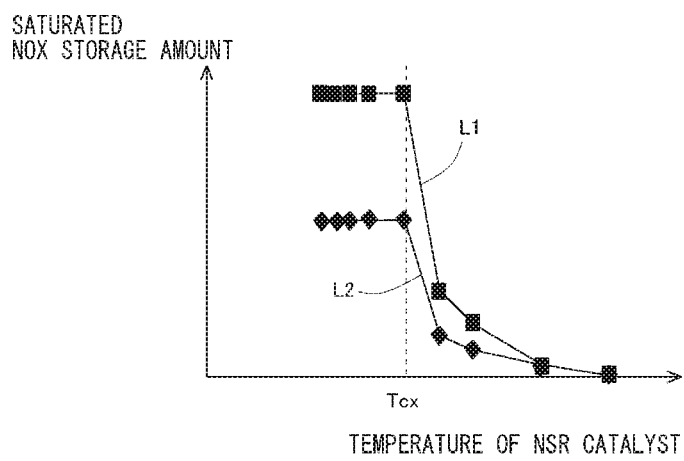

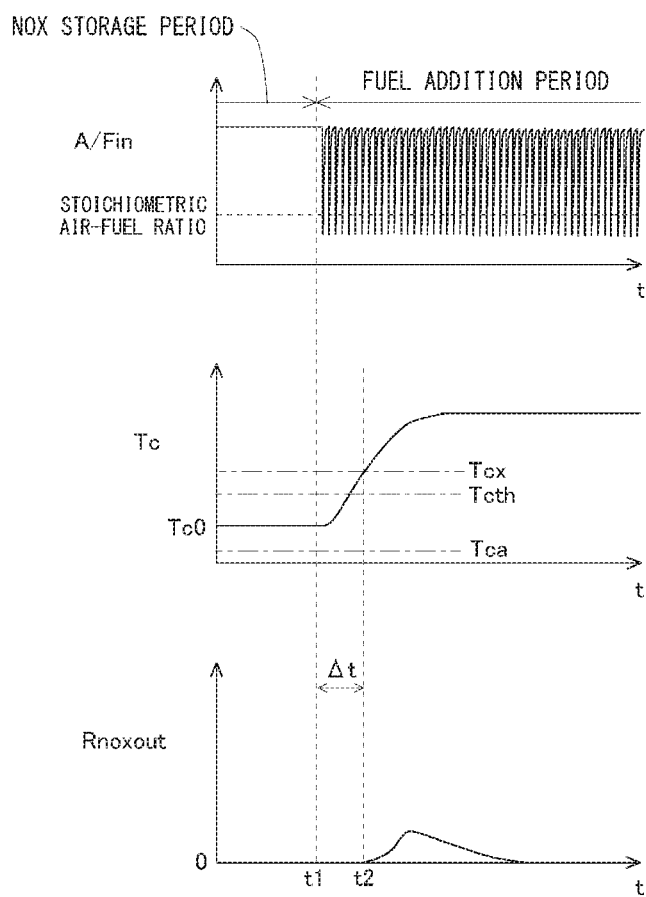
[FIG. 4]

[FIG. 5]
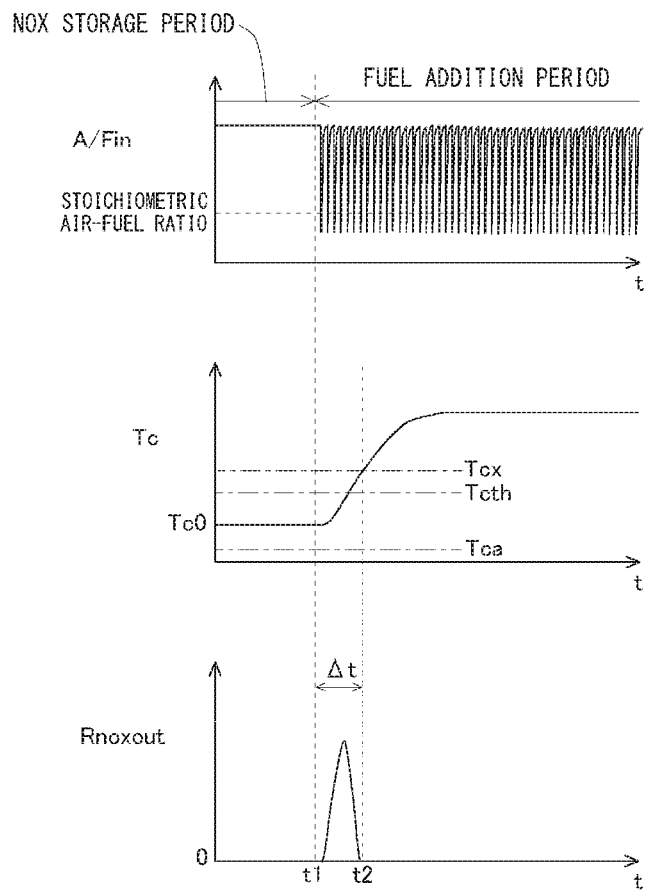
[FIG. 6]
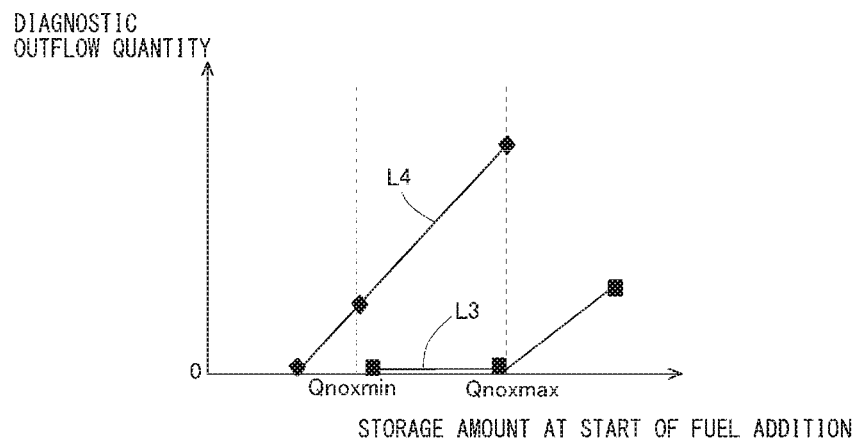

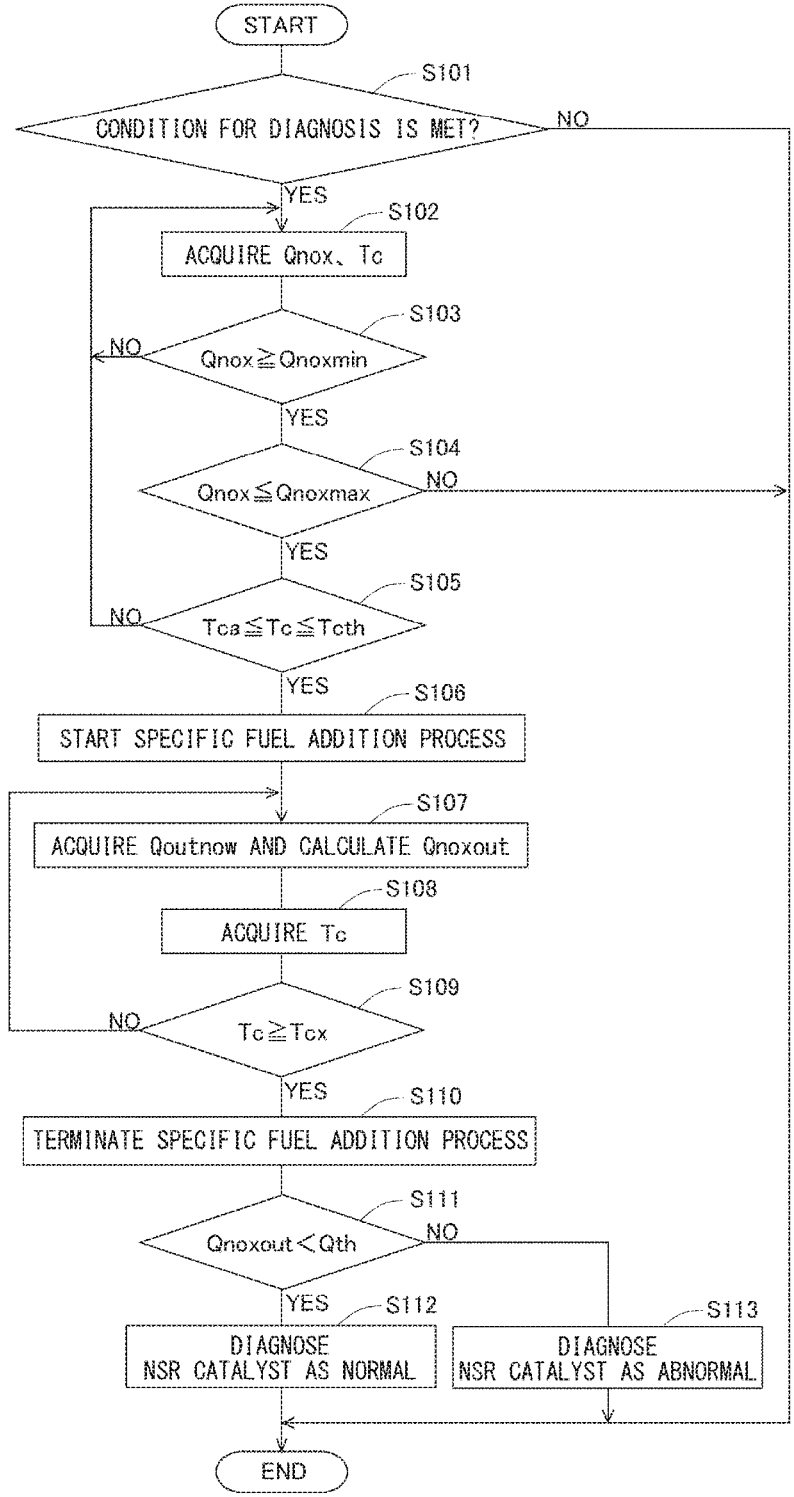
[FIG. 7]

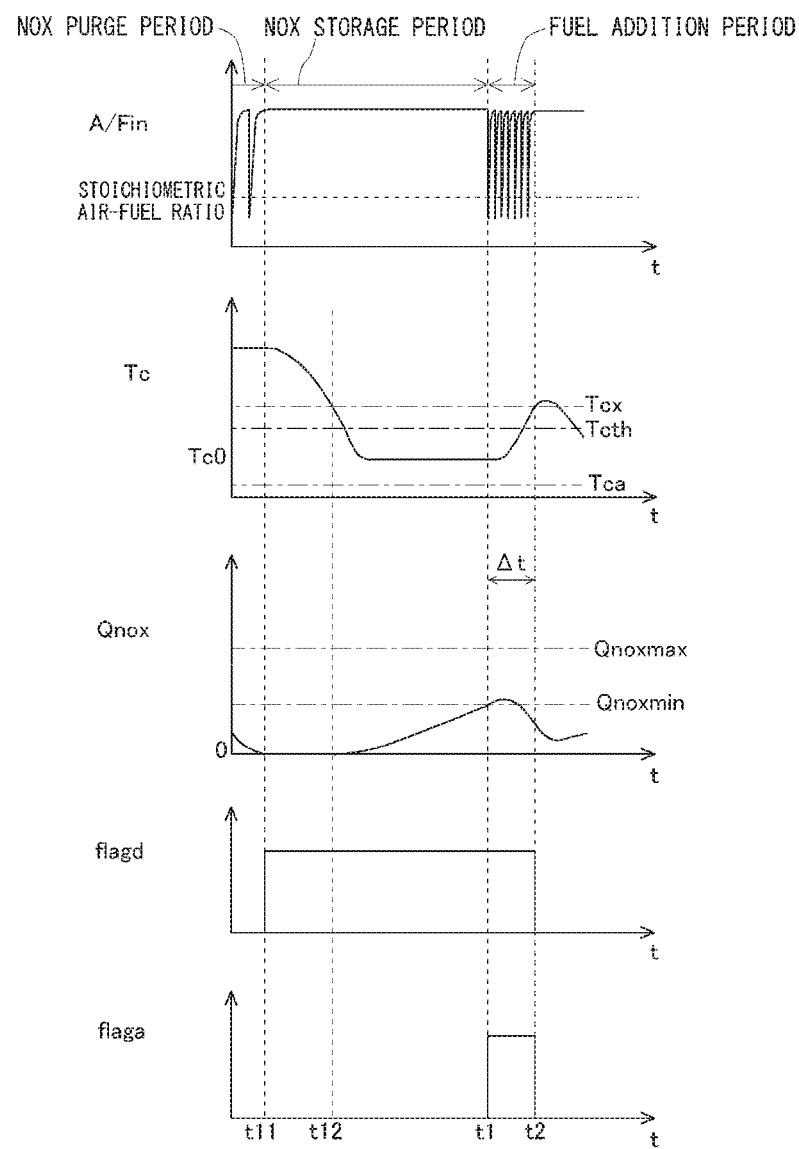
[FIG. 8]

[FIG. 9]
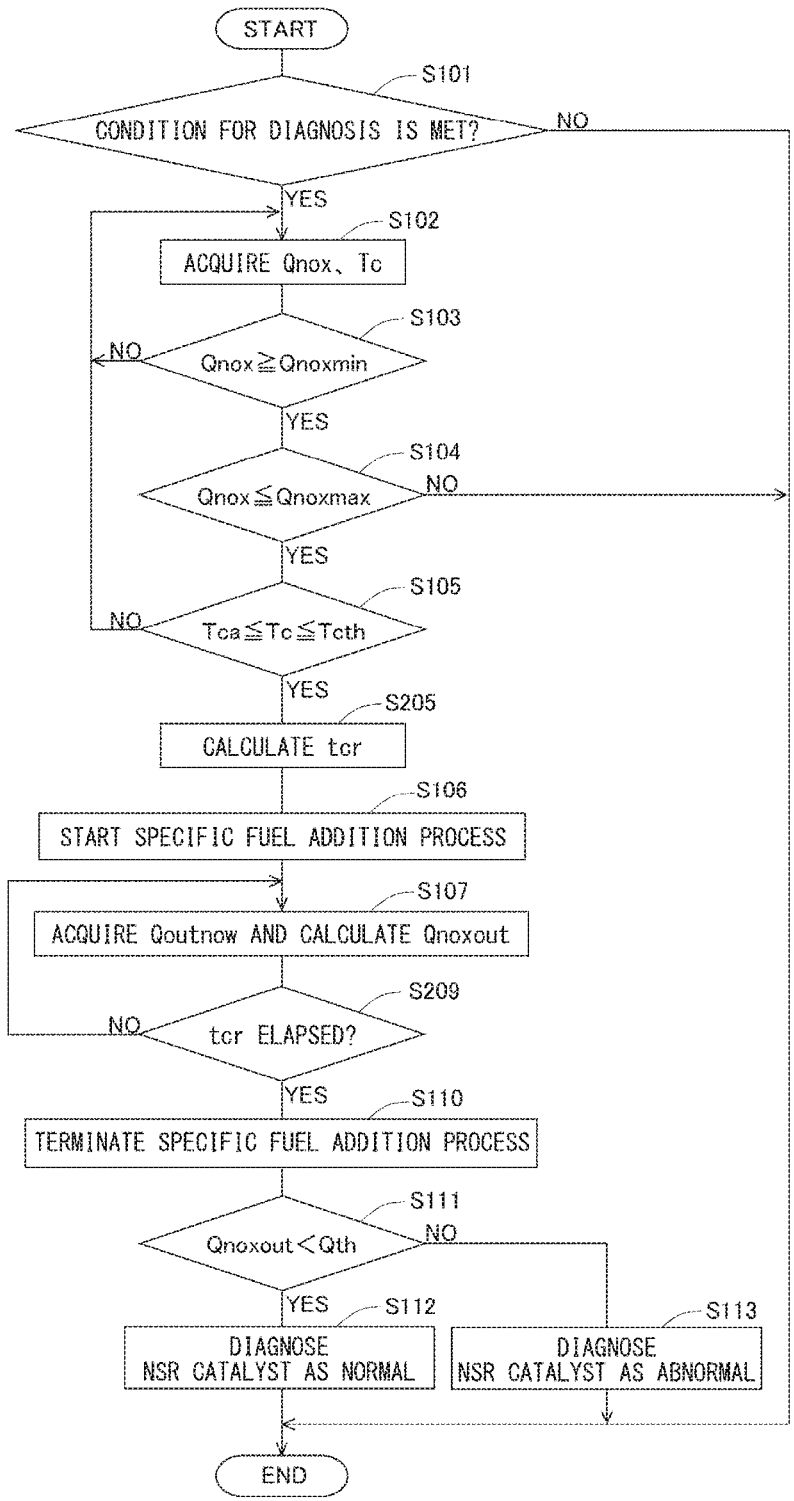

[FIG. 10]
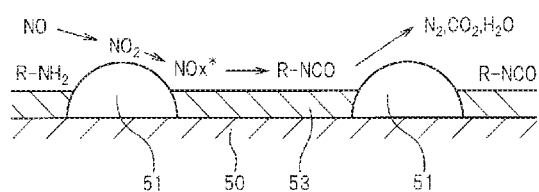
[FIG. 11]
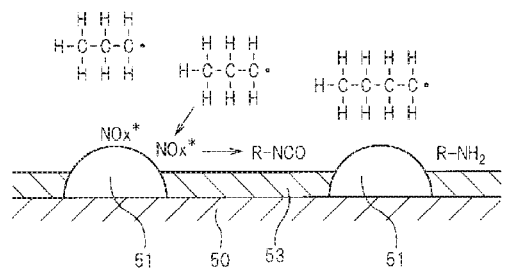

[FIG. 12]
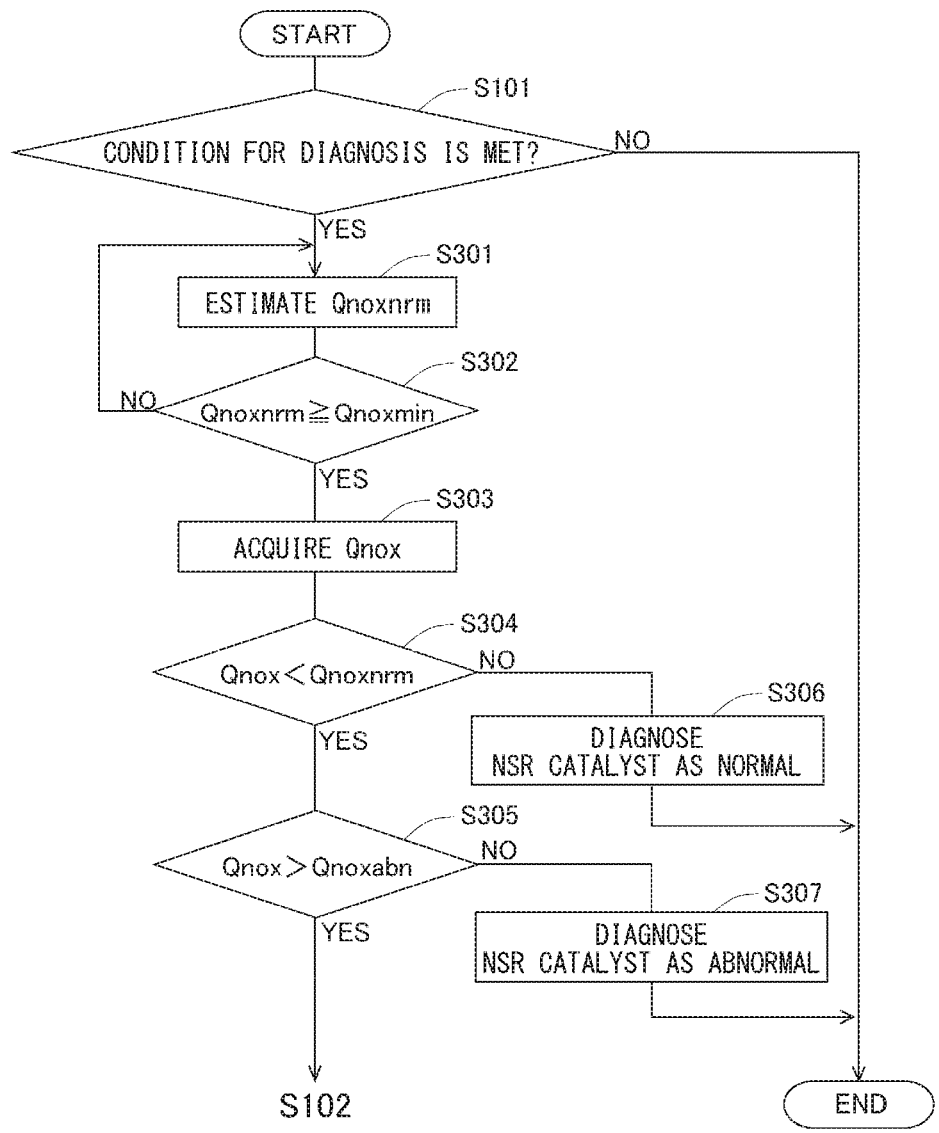

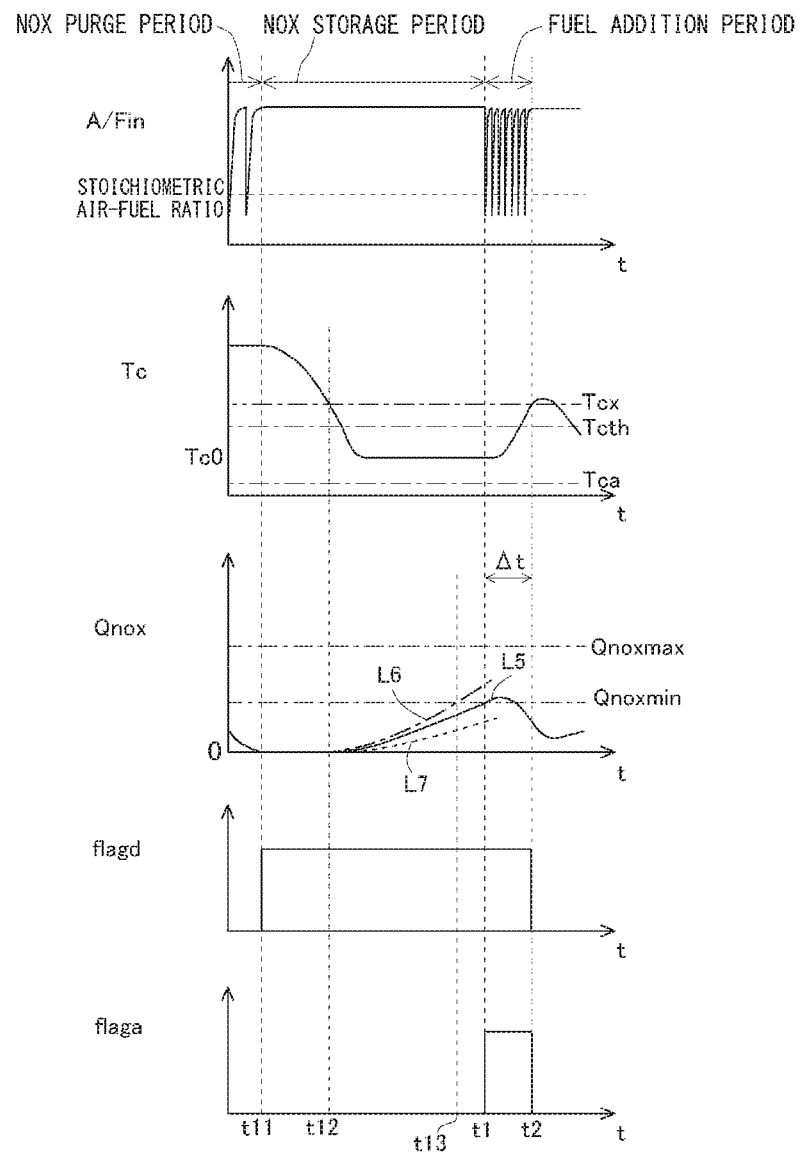
[FIG. 13A]

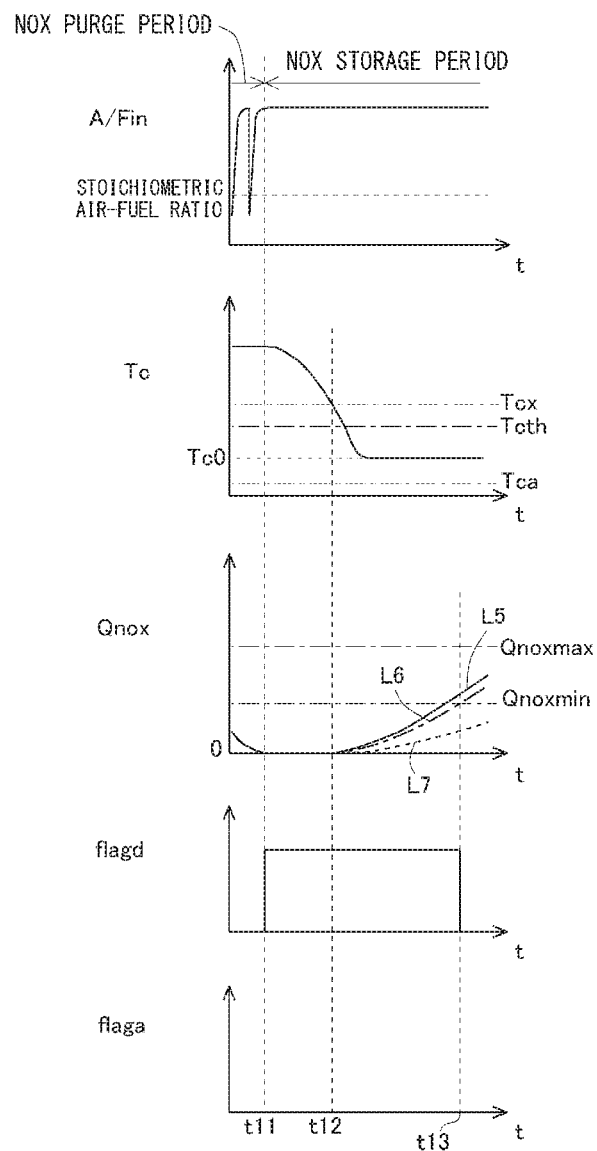
[FIG. 13B]

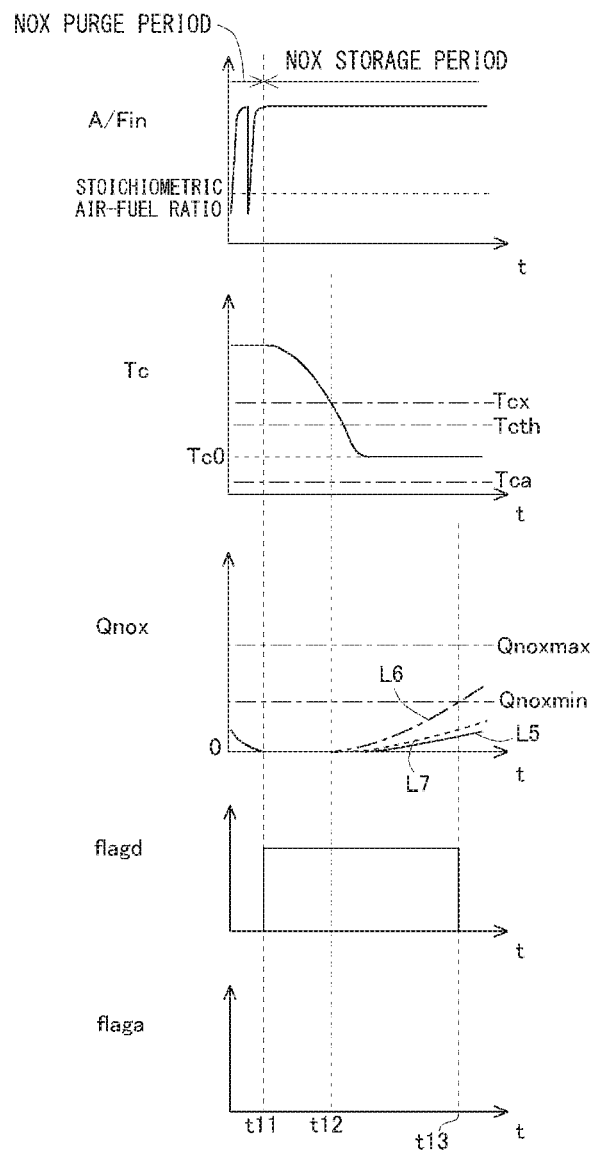
[FIG. 13C]

ABNORMALITY DIAGNOSIS APPARATUS FOR EXHAUST GAS PURIFICATION APPARATUS

CROSS-REFERENCE TO RELATED APPLICATIONS

This application claims priority to Japanese Patent Application No. 2017-060690 filed on Mar. 27, 2017, the entire contents of which are incorporated by reference.

BACKGROUND

Technical Field

The present disclosure relates to an abnormality diagnosis apparatus applied to an exhaust gas purification apparatus of an internal combustion engine.

Description of the Related Art

It is known in prior arts to provide a NOx storage reduction catalyst (which will also be referred to as the "NSR catalyst" hereinafter) in an exhaust passage of an internal combustion engine that operates in a lean burn mode, in which the air-fuel ratio of the air-fuel mixture is a lean air-fuel ratio higher than the stoichiometric air-fuel ratio. The NSR catalyst has the function of storing NOx in the exhaust gas when the atmosphere around it has a lean air-fuel ratio and reducing NOx stored therein under the presence of a reducing agent when the atmosphere around it has a rich air-fuel ratio lower than the stoichiometric air-fuel ratio. It should be noted that the term "store" also means to adsorb, in this specification.

Patent Literatures 1 to 4 in the list given below disclose technologies pertaining to the method of determining deterioration of an NSR catalyst. For example, according to Patent Literature 1, two oxygen sensors having different sensitivities are provided downstream of an NSR catalyst. The difference between these sensors in the time until the sensor output becomes equal to or smaller than a specific value is measured. Furthermore the NOx storage amount (i.e. the amount of NOx stored in the NSR catalyst) is estimated. If the time difference measured as above is smaller than a predetermined time, it is determined that the NSR catalyst is sulfur poisoned. If the time difference is equal to or larger than the predetermined time and the estimated amount of stored NOx is smaller than a predetermined reference amount, it is determined that the NSR catalyst is deteriorated by heat.

According to Patent Literature 2, an ideal NOx storage amount is calculated using a map that specifies the NOx storage amount in the NSR catalyst taking account of aging, and the actual NOx storage amount is calculated on the basis of a measurement value of an NOx sensor provided in the exhaust passage. If the difference between the ideal NOx storage amount and the actual NOx storage amount after performing desulfurization control is smaller than a threshold, it is determined that the NSR catalyst has recovered from sulfur poisoning by the desulfurization control. If the difference is larger than the threshold, it is determined that the NSR catalyst is deteriorated by heat.

According to Patent Literature 3, the NOx storage amount is calculated on the basis of an output of a sensor provided downstream of the NSR catalyst during what is called the rich spike process. If the NOx storage amount thus calculated is smaller than a threshold, it is determined that the NSR catalyst is deteriorated.

According to Patent Literature 4, the NOx storage amount in the NSR catalyst is estimated. If the concentration of NOx measured by an NOx sensor provided downstream of the NSR catalyst is equal to or higher than a specific concentration at the time when the estimated NOx storage amount reaches the maximum amount of NOx that the NSR catalyst in a normal condition can store, after storage of NOx by the NSR catalyst is restarted after NOx reduction control, it is determined that the NSR catalyst is deteriorated.

CITATION LIST

Patent Literature

Patent Literature 1: Japanese Patent Application Laid-Open No. 2008-255965
Patent Literature 2: Japanese Patent Application Laid-Open No. 2014-202126
Patent Literature 3: Japanese Patent Application Laid-Open No. 2008-064075
Patent Literature 4: Japanese Patent Application Laid-Open No. 2007-162468

SUMMARY

The NOx storage amount in the NSR catalyst can be calculated from the quantity of NOx flowing into the NSR catalyst and the quantity of NOx flowing out of the NSR catalyst. The NOx storage amount calculated in this way is used in abnormality diagnosis of an NSR catalyst in some cases. In such cases, for example, the maximum amount of NOx that the NSR catalyst in a standard normal condition can store is used as a reference amount of the NOx storage amount, and diagnosis as to abnormality of an NSR catalyst is made on the basis of the NOx storage amount calculated in the above-described manner and the aforementioned reference amount. This reference amount varies depending on some factors including the temperature of the NSR catalyst and the flow rate of the exhaust gas passing through the NSR catalyst. Therefore, in order to diagnose abnormality of the NSR catalyst using this reference amount, it is necessary to estimate the reference amount. However, the estimated reference amount can have an estimation error. Specifically, the reference amount can have an error derived from errors (e.g. sensor variations) arising in the process of acquiring parameters used in estimating the reference amount (e.g. the temperature of the NSR catalyst and the flow rate of the exhaust gas passing through the NSR catalyst) and an error arising in the process of estimating the reference amount.

The larger the degree of deterioration of the NSR catalyst is, the smaller the amount of NOx stored in the NSR catalyst is. Therefore, the difference between the amount of NOx stored in the NSR catalyst and the reference amount increases with the progress of deterioration of the NSR catalyst. Therefore, it is possible to diagnose abnormality of the NSR catalyst on the basis of, for example, the difference between the NOx storage amount calculated in the above-described manner and the reference amount. This difference will also be referred to as "determinative difference" hereinafter. However, if the degree of deterioration of the NSR catalyst is relatively small, the determinative difference is small. Then, the ratio of the estimation error of the reference amount on the determinative difference is relatively large. Therefore, if abnormality diagnosis of an NSR catalyst is performed on the basis of the determinative difference when the degree of deterioration of the NSR catalyst is relatively small, there is a possibility that a wrong diagnosis may be made. Thus, it is sometimes difficult for this abnormality diagnosis method to diagnose that the NSR catalyst is abnormal when the degree of deterioration of the NSR catalyst is relatively small.

The present disclosure has been made in view of the above-described problem, and an object of the present disclosure is to provide a technology that enables the diagnosis that an NSR catalyst is abnormal to be made even when the degree of deterioration of the NSR catalyst is relatively small yet, in abnormality diagnosis of an NSR catalyst provided in an exhaust passage of an internal combustion engine that operates in a lean burn mode.

Solution to Problem

When performing abnormality diagnosis of an NSR catalyst, an abnormality diagnosis apparatus according to the present disclosure starts to perform a specific fuel addition process, which is the process of adding fuel through a fuel addition valve repeatedly at a specific cycle, when the NSR catalyst is in a specific start condition. Moreover, the abnormality diagnosis apparatus performs abnormality diagnosis of the NSR catalyst on the basis of the quantity of NOx flowing out of the NSR catalyst over a specific period in the period from when the specific fuel addition process is started to when the temperature of the NSR catalyst reaches a thermal desorption temperature.

More specifically, an abnormality diagnosis apparatus for an exhaust gas purification apparatus according to the present disclosure is applied to an exhaust gas purification apparatus for an internal combustion engine that operates in a lean burn mode and including an NOx storage reduction catalyst provided in an exhaust passage of said internal combustion engine and a fuel addition valve provided in the exhaust passage upstream of said NOx storage reduction catalyst to add fuel to the exhaust gas. The abnormality diagnosis apparatus according to the present disclosure comprises a controller comprising at least one processor configured to: determine the outflowing NOx quantity from said NOx storage reduction catalyst; determine the NOx storage amount in said NOx storage reduction catalyst on the basis of said outflowing NOx quantity; perform a specific fuel addition process of adding fuel by said fuel addition valve repeatedly at a specific cycle to raise the temperature of said NOx storage reduction catalyst, the quantity of fuel added by each fuel addition in said specific fuel addition process and said specific cycle being set in such a way that NOx stored in said NOx storage reduction catalyst is desorbed and the average air-fuel ratio of the exhaust gas flowing into said NOx storage reduction catalyst is kept at a lean air-fuel ratio higher than the stoichiometric air-fuel ratio during the time in which said specific fuel addition process is being performed; and make a diagnosis as to whether said NOx storage reduction catalyst is normal or abnormal, wherein said controller is further configured to start said specific fuel addition process when said NOx storage reduction catalyst is in a specific start condition in which said NOx storage amount determined by the controller falls within a specific range and the temperature of said NOx storage reduction catalyst is equal to or lower than a specific temperature that is lower than a thermal desorption temperature defined as a temperature above which NOx can flow out of said NOx storage reduction catalyst when said specific fuel addition process is performed even if said NOx storage reduction catalyst is normal, and equal to or higher than the activation temperature of said NOx storage reduction catalyst, and diagnose said NOx storage reduction catalyst on the basis of said outflowing NOx quantity over a specific period in a period from when said specific fuel addition process is started to when the temperature of said NOx storage reduction catalyst reaches said thermal desorption temperature.

The exhaust gas purification apparatus to which the present disclosure is applied has a fuel injection valve provided in the exhaust passage upstream of the NSR catalyst. As fuel is added by the fuel addition valve, the added fuel is supplied to the NSR catalyst with the exhaust gas. In the abnormality diagnosis apparatus according to the present disclosure, the controller performs the specific fuel addition process, which is the process of adding fuel through the fuel addition valve repeatedly at a specific cycle. As the specific fuel addition process is performed, the temperature of the NSR catalyst rises gradually because of the oxidation reaction of fuel that occurs in the NSR catalyst.

The NSR catalyst has a saturated NOx storage amount. The saturated NOx storage amount correlates with the temperature of the NSR catalyst, and it decreases abruptly when the temperature of the NSR catalyst exceeds a certain temperature. For example, when the specific fuel addition process is performed and the temperature of the NSR catalyst rises gradually to exceed a certain temperature, the saturated NOx storage amount decreases abruptly, resulting in a situation in which the saturated NOx storage amount becomes smaller than the amount of NOx stored in the NSR catalyst previously. Then, a portion of NOx previously stored in the NSR catalyst can be desorbed from the NSR catalyst. Such desorption of NOx that occurs due to an abrupt decrease of the saturated NOx storage amount when the temperature of the NSR catalyst exceeds a certain temperature will be hereinafter referred to as "thermal desorption".

In the specific fuel addition process, the quantity of fuel added by each fuel addition and the specific cycle of repetitive fuel addition are set in such a way that the average air-fuel ratio of the exhaust gas flowing into the NSR catalyst during the fuel addition process is kept at a lean air-fuel ratio higher than the stoichiometric air-fuel ratio. Therefore, in circumstances in which thermal desorption occurs with the specific fuel addition process, the quantity of supplied reducing agent (i.e. fuel) tends to be insufficient relative to the quantity of desorbed NOx. Therefore, when thermal desorption occurs with the specific fuel addition process, a portion of desorbed NOx flows out of the NSR catalyst without being reduced. When the temperature of the NSR catalyst is higher than a certain temperature, thermal desorption can occur even if the NSR catalyst is normal, whether or not the specific fuel addition process is being performed. From the above follows that when the temperature of the NSR catalyst becomes higher than a certain temperature in the specific fuel addition process, a portion of NOx thermally desorbed from the NSR catalyst can flow out of the NSR catalyst even if the NSR catalyst is normal. Such a temperature above which NOx can flow out of the NSR catalyst with the specific fuel addition process even if the NSR catalyst is normal will be hereinafter referred to as the "thermal desorption temperature".

Even when the NOx storage amount in the NSR catalyst is equal to or smaller than the saturated NOx storage amount, a portion of NOx stored in the NSR catalyst is desorbed from the NSR catalyst if the air-fuel ratio of the exhaust gas flowing into the NSR catalyst is temporarily changed to a rich air-fuel ratio lower than the stoichiometric air-fuel ratio by the supply of fuel as reducing agent to the NSR catalyst. Such desorption of NOx that occurs due to the air-fuel ratio of the exhaust gas flowing into the NSR catalyst that is temporarily changed to a rich air-fuel ratio lower than the stoichiometric air-fuel ratio will be hereinafter referred to as "normal desorption". In the specific fuel addition process, the quantity of fuel added by each fuel addition is set in such a way that such normal desorption will occur. The normally desorbed NOx tends to be reduced by reducing agent (fuel). However, the NOx normally desorbed by the specific fuel addition process may flow out of the NSR catalyst in some cases due to difficulty in reduction by reducing agent (fuel). Such cases will be described in the following.

The NSR catalyst includes a catalyst carrier and a noble metal catalyst supported on the catalyst carrier. The normally desorbed NOx can be reduced by reducing agent (fuel) supplied to the NSR catalyst with the catalytic effect of the noble metal catalyst. If in a normal condition, the noble metal catalyst exhibits the catalytic effect when its temperature is equal to or higher than its activation temperature. If the noble metal catalyst is deteriorated, it is not apt to exhibit the catalytic effect even when its temperature is equal to or higher than the activation temperature. In such cases, the normally desorbed NOx is not apt to be reduced and consequently tends to flow out of the NSR catalyst. As above, if the NSR catalyst is abnormal, the NOx normally desorbed with the specific fuel addition process is not apt to be reduced by reducing agent (fuel) and tends to flow out of the NSR catalyst.

If the NSR catalyst is normal, the NOx normally desorbed by the specific fuel addition process tends to be reduced by reducing agent (fuel). Therefore, the outflow of the normally desorbed NOx from the NSR catalyst scarcely occurs. As above, the NOx normally desorbed with the specific fuel addition process scarcely flows out of the NSR catalyst when the NSR catalyst is normal and tends to flow out of the NSR catalyst when the NSR catalyst is abnormal. Thus, it has been discovered that abnormality diagnosis of the NSR catalyst can be performed on the basis of the quantity of normally desorbed NOx that may flow out of the NSR catalyst with the specific fuel addition process.

Moreover, the present inventors have discovered that when the NOx storage amount determined by the controller falls within the specific range, the quantity of normally desorbed NOx flowing out of the NSR catalyst with the specific fuel addition process is very small in the case where the NSR catalyst is normal. The inventors have also discovered that in the case where the NSR catalyst is abnormal, the normally desorbed NOx flows out of the NSR catalyst in a quantity large enough to be measured by the controller, even when the degree of deterioration of the NSR catalyst is relatively small yet. In this connection, the controller measures the quantity of NOx flowing out of the NSR catalyst over a certain period. Therefore, when abnormality diagnosis of the NSR catalyst is performed on the basis of the quantity of NOx flowing out of the NSR catalyst in this way, an abnormality of the NSR catalyst can be diagnosed even if the degree of deterioration of the NSR catalyst is too small to diagnose for the technologies disclosed in the cited literatures. When the NOx storage amount determined by the controller is smaller than the lower bound of the specific range, the quantity of normally desorbed NOx flowing out of the NSR catalyst tends to be relatively small even if the NSR catalyst is abnormal. When the NOx storage amount determined by the controller is larger than the upper bound of the specific range, the quantity of normally desorbed NOx flowing out of the NSR catalyst tends to be relatively large even if the NSR catalyst is normal.

Therefore, the controller is configured to start the specific fuel addition process when the NSR catalyst is in the specific start condition in which the NOx storage amount determined by the controller falls within the specific range and the temperature of the NSR catalyst is equal to or lower than a specific temperature that is lower than the thermal desorption temperature, and equal to or higher than the activation temperature of the NSR catalyst.

As the specific fuel addition process is started as above, the temperature of the NSR catalyst rises gradually toward the thermal desorption temperature. In the course of this, unreduced NOx, namely NOx that is not reduced by reducing agent (fuel) flows out of the NSR catalyst, when the NSR catalyst is abnormal, even if the degree of deterioration is relatively small yet. If the specific fuel addition process is started when the temperature of the NSR catalyst is higher than the aforementioned specific temperature, the difference between the temperature of the NSR catalyst at the time when the specific fuel addition process is started and the thermal desorption temperature is small. Then, it is difficult to accurately measure the quantity of unreduced NOx flowing out of the NSR catalyst during the period from when the specific fuel addition process is started to when the temperature of the NSR catalyst reaches the thermal desorption temperature. Therefore, the controller is configured to start the specific fuel addition process when the temperature of the NSR catalyst is equal to or lower than the specific temperature and equal to or higher than the activation temperature of the NSR catalyst.

If the NSR catalyst is normal, unreduced NOx scarcely flows out of the NSR catalyst until the temperature of the NSR catalyst reaches the thermal desorption temperature. When the temperature of the NSR catalyst reaches the thermal desorption temperature, a portion of the thermally desorbed NOx flows out of the NSR catalyst without being reduced. Therefore, the controller can diagnose the NSR catalyst on the basis of the quantity of NOx flowing out of the NSR catalyst over a specific period in the period from when the specific fuel addition process is started to when the temperature of the NSR catalyst reaches the thermal desorption temperature. The specific period mentioned above is any period in the above period that has a duration long enough to enable acquisition of the quantity of unreduced NOx flowing out of the NSR catalyst having a relatively small degree of deterioration with relatively high accuracy during that period. The controller may diagnose the NSR catalyst as abnormal if, for example, the quantity of NOx flowing out of the NSR catalyst during the specific period is larger than a certain threshold.

According to the present disclosure, if the NSR catalyst is abnormal, unreduced NOx flows out of the NSR catalyst during the specific period even when the degree of deterioration of the NSR catalyst is relatively small yet. Therefore, it is possible to diagnose the NSR catalyst as abnormal even when the degree of deterioration of the NSR catalyst is relatively small yet.

The abnormality diagnosis apparatus for an exhaust gas purification apparatus according to the present disclosure, wherein said controller may be further configured to estimate a normal storage amount defined as the amount of NOx stored in said NOx storage reduction catalyst in a standard normal condition.

The NSR catalyst in a standard normal condition refers to an NSR catalyst that is in a specific deteriorated condition in which the NSR catalyst is regarded as normal, that is, for example an NSR catalyst that is deteriorated to a degree small enough to keep the emissions below a limit set by regulations. The controller estimates the normal storage amount according to the operation state of the internal combustion engine from parameters such as the quantity of NOx flowing into the NSR catalyst per unit time, the temperature of the NSR catalyst, and the flow rate of the exhaust gas discharged from the internal combustion engine. The controller can diagnose the NSR catalyst without performing the specific fuel addition process.

Specifically, said controller may diagnose said NOx storage reduction catalyst as abnormal without performing said specific fuel addition process, if said NOx storage amount determined by the controller is equal to or smaller than a specific abnormal storage amount that is smaller than the lower bound of said specific range when said normal storage amount is equal to or larger than the lower bound of said specific range.

In that case, although the normal storage amount is equal to or larger than the lower bound of the specific range, the NOx storage amount determined by the controller is equal to or smaller than the abnormal storage amount, and therefore the specific fuel addition process is not started. The specific abnormal storage amount is an amount smaller than the lower bound of the specific range. if the aforementioned NOx storage amount is equal to or smaller than the abnormal storage amount even though the normal storage amount is equal to or larger than the lower bound of the specific range, it is considered that the degree of deterioration of the NSR catalyst is relatively large. Then, the controller may diagnose the NSR catalyst as abnormal even before the start of the specific fuel addition process. Thus, in the case where the degree of deterioration of the NSR catalyst is relatively large, it is possible to diagnose the NSR catalyst as abnormal as soon as possible without performing the specific fuel addition process. Moreover, even in the case where the degree of deterioration is so large that the amount of NOx stored in the NSR catalyst does not reach the lower bound of the specific range, it is possible to diagnose the NSR catalyst without performing the specific fuel addition process. The specific abnormal storage amount may de determined according to the operation state of the internal combustion engine. For example, the specific abnormal storage amount is set on the basis of the normal storage amount that is estimated according to the operation state of the internal combustion engine. More specifically, the specific abnormal storage amount may be set to a value smaller than the lower bound of a range that represents the normal storage amount determined taking account of possible errors in its estimation and other factors.

Said controller may start said specific fuel addition process when said NOx storage reduction catalyst is in said specific start condition, said normal storage amount is equal to or larger than the lower bound of said specific range, and said NOx storage amount determined by the controller is smaller than said normal storage amount, and if said NOx storage amount determined by the controller is equal to or larger than said normal storage amount when said normal storage amount is equal to or larger than the lower bound of said specific range, said controller may diagnose said NOx storage reduction catalyst as normal without performing said specific fuel addition process. Thus, the controller may diagnose the NSR catalyst as normal as soon as possible without performing the specific fuel addition process.

By setting the quantity of fuel added by each fuel addition in the specific fuel addition process and the specific cycle in an appropriate range, reductive intermediates can be produced in the NSR catalyst. In the diagnosis apparatus according to the present disclosure, wherein said controller is further configured to perform said specific fuel addition process while setting the quantity of fuel added by each fuel addition in said specific fuel addition process and said specific cycle within a range of fuel addition quantity and cycle in which a reductive intermediate(s) is produced with supply of fuel to said NOx storage reduction catalyst so that the quantity of said reductive intermediate(s) produced is commensurate with the quantity of NOx flowing into said NOx storage reduction catalyst per unit time during the performance of said specific fuel addition process.

In consequence, it is possible to reduce NOx that newly flows into the NSR catalyst with the exhaust gas during the specific fuel addition process by the reactive intermediate(s). Thus, it is possible to prevent, as much as possible, NOx other than the NOx desorbed from the NSR catalyst by the performance of the specific fuel addition process (namely, NOx that flows newly into the NSR catalyst with the exhaust gas during the specific fuel addition process) from being included in the outflowing NOx quantity determined by the controller during the performance of the specific fuel addition process. Therefore, it is possible to further improve the accuracy of abnormality diagnosis of the NSR catalyst performed by the controller on the basis of the quantity of NOx flowing out of the NSR catalyst.

The present disclosure enables the diagnosis that an NSR catalyst is abnormal to be made even when the degree of deterioration of the NSR catalyst is relatively small yet, in abnormality diagnosis of an NSR catalyst provided in an exhaust passage of an internal combustion engine that operates in a lean burn mode.

BRIEF DESCRIPTION OF DRAWINGS

FIG. 1 is a diagram showing the general configuration of air-intake and exhaust systems of an internal combustion engine according to an embodiment of the present disclosure.

FIG. 2 is a time chart showing changes with time of the timing of fuel addition, the air-fuel ratio A/Fin of the inflowing exhaust gas, and the catalyst temperature Tc when the specific fuel addition process according to the embodiment of the present disclosure is performed.

FIG. 3 is a diagram showing relationship between the temperature of an NSR catalyst and the saturated NOx storage amount of the NSR catalyst.

FIG. 4 is a first time chart that illustrates how the NOx concentration Rnoxout of the outflowing exhaust gas changes with time in a case where the specific fuel addition process is performed when the NSR catalyst is in a specific start condition.

FIG. 5 is a second time chart that illustrates how the NOx concentration Rnoxout of the outflowing exhaust gas changes with time in a case where the specific fuel addition process is performed when the NSR catalyst is in a specific start condition.

FIG. 6 is a graph showing relationship between the NOx storage amount in the NSR catalyst and the quantity of NOx flowing out of the NSR catalyst.

FIG. 7 is a flow chart of a control flow executed by the abnormality diagnosis apparatus for an exhaust gas purification apparatus according to a first embodiment.

FIG. 8 is a time chart showing, for illustration of the control flow shown in FIG. 7, changes with time of the air-fuel ratio A/Fin of the inflowing exhaust gas, the catalyst temperature Tc, the storage amount Qnox, a diagnosis flag flagd, and a start flag flaga.

FIG. 9 is a flow chart of a control flow executed by the abnormality diagnosis apparatus for an exhaust gas purification apparatus according to a first modification of the first embodiment.

FIG. 10 is a first diagram showing oxidation-reduction reactions that are supposed to occur in the NSR catalyst when a specific fuel addition process according to a second modification of the first embodiment is performed.

FIG. 11 is a second diagram showing oxidation-reduction reactions that are supposed to occur in the NSR catalyst when the specific fuel addition process according to the second modification of the first embodiment is performed.

FIG. 12 is a flow chart of a control flow executed by an abnormality diagnosis apparatus for an exhaust gas purification apparatus according to a second embodiment.

FIG. 13A is a time chart showing, for illustration of the control flow shown in FIG. 12, changes with time of the air-fuel ratio A/Fin of the inflowing exhaust gas, the catalyst temperature Tc, the storage amount Qnox, the diagnosis flag flagd, and the start flag flaga when the NSR catalyst is abnormal with a relatively small degree of deterioration.

FIG. 13B is a time chart showing, for illustration of the control flow shown in FIG. 12, changes with time of the air-fuel ratio A/Fin of the inflowing exhaust gas, the catalyst temperature Tc, the storage amount Qnox, the diagnosis flag flagd, and the start flag flaga when the NSR catalyst is normal.

FIG. 13C is a time chart showing, for illustration of the control flow shown in FIG. 12, changes with time of the air-fuel ratio A/Fin of the inflowing exhaust gas, the catalyst temperature Tc, the storage amount Qnox, the diagnosis flag flagd, and the start flag flaga when the NSR catalyst is abnormal with a relatively large degree of deterioration.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.
<First Embodiment>
(Configuration of Air-Intake and Exhaust Systems of Internal Combustion Engine)

FIG. 1 is a diagram showing the general configuration of air-intake and exhaust systems of an internal combustion engine according to a first embodiment. The internal combustion engine 1 shown in FIG. 1 is a compression-ignition internal combustion engine (diesel engine). It should be understood that the present disclosure can also be applied to spark-ignition, lean-burn internal combustion engines that use gasoline or the like as fuel.

The internal combustion engine 1 is connected with an intake passage 2 and an exhaust passage 3. The intake passage 2 is provided with an air flow meter 4. The air flow meter 4 measures the intake air quantity of the internal combustion engine 1. The intake passage 2 downstream of the air flow meter 4 is provided with a throttle valve 5. The throttle valve 5 is capable of varying the channel cross sectional area in the intake passage 2 to control the intake air quantity of the internal combustion engine 1.

The exhaust passage 3 is provided with an NSR catalyst 6 as an exhaust gas purification catalyst. Besides the NSR catalyst 6, the exhaust passage 3 may further be provided with a selective catalytic reduction NOx catalyst and a particulate filter. The exhaust passage 3 upstream of the NSR catalyst 6 is provided with a fuel addition valve 7. The fuel addition valve 7 is capable of adding fuel to the exhaust gas. The fuel added through the fuel addition valve 7 is supplied to the NSR catalyst 6 with the exhaust gas.

The exhaust passage 3 is also provided with an upstream NOx sensor 13 and an air-fuel ratio sensor 14, which are arranged downstream of the fuel addition valve 7 and upstream of the NSR catalyst 6. The upstream NOx sensor 13 measures the NOx concentration in the exhaust gas flowing into the NSR catalyst 6 (which will also be referred to as the "inflowing exhaust gas" hereinafter). The air-fuel ratio sensor 14 measures the air-fuel ratio of the inflowing exhaust gas. The exhaust passage 3 downstream of the NSR catalyst 6 is provided with a downstream NOx sensor 15 and a temperature sensor 16. The downstream NOx sensor 15 measures the NOx concentration in the exhaust gas flowing out of the NSR catalyst 6 (which will also be referred to as the "outflowing exhaust gas" hereinafter). The temperature sensor 16 measures the temperature of the outflowing exhaust gas.

An electronic control unit (ECU) 10 that controls the internal combustion engine 1 is provided for the internal combustion engine 1. The ECU 10 is electrically connected with the air flow meter 4, the upstream NOx sensor 13, the air-fuel ratio sensor 14, the downstream NOx sensor 15, and the temperature sensor 16. The ECU 10 is also electrically connected with a crank angle sensor 11 and an accelerator opening degree sensor 12. The crank angle sensor 11 outputs a signal correlating with the crank angle of the internal combustion engine 1. The accelerator opening degree sensor 12 outputs a signal correlating with the accelerator opening degree of the vehicle provided with the internal combustion engine 1.

The measurement values of the aforementioned sensors are input to the ECU 10. The ECU 10 calculates the engine speed of the internal combustion engine 1 on the basis of the measurement value of the crank angle sensor 11. The ECU 10 calculates the engine load of the internal combustion engine 1 on the basis of the measurement value of the accelerator opening degree sensor 12. The ECU 10 calculates the inflowing NOx quantity, which is defined as the quantity of NOx flowing into the NSR catalyst 6 during a certain period of time, on the basis of the measurement values of the air flow meter 4 and the upstream NOx sensor 13. The ECU 10 calculates the outflowing NOx quantity, which is defined as the quantity of NOx flowing out of the NSR catalyst 6 during a certain period of time, on the basis of the measurement values of the air flow meter 4 and the downstream NOx sensor 15. The ECU 10 calculates the temperature of the NSR catalyst 6 on the basis of the measurement value of the temperature sensor 16. The temperature of the NSR catalyst 6 will also be referred to as the "catalyst temperature" hereinafter.

The ECU 10 is also electrically connected with a fuel injection valve (not shown) of the internal combustion engine 1, the throttle valve 5, and the fuel addition valve 7. These components are controlled by the ECU 10.
(Abnormality Diagnosis of NSR Catalyst)

The exhaust gas purification apparatus according to this embodiment performs abnormality diagnosis of the NSR catalyst 6. In the following, the method of abnormality diagnosis of the NSR catalyst 6 according to this embodiment will be described. In this embodiment, the ECU calculates the quantity of NOx flowing into the NSR catalyst 6 and the quantity of NOx flowing out of the NOx catalyst as described above. Moreover, the ECU 10 can calculate the NOx storage amount in the NSR catalyst 6 from the calculated values of the inflowing NOx quantity and the outflowing NOx quantity. Specifically, the NOx storage amount in the NSR catalyst 6 can be calculated by adding up the inflowing NOx quantity as the increase of the NOx storage amount and the outflowing NOx quantity as the decrease of the NOx storage amount. As the deterioration of the NSR catalyst 6 progresses, the amount of NOx stored into the NSR catalyst 6 decreases, even if the inflowing NOx quantity is the same. Consequently, the calculated value of the NOx storage amount in the NSR catalyst 6 decreases.

As the deterioration of the NSR catalyst 6 progresses, the difference between the calculated value of the NOx storage amount in the NSR catalyst 6 and the maximum amount of NOx that the NSR catalyst 6 in a standard normal condition can store (which serves as a reference amount) increases. Therefore, it may appear that it is possible to diagnose abnormality of the NSR catalyst 6 on the basis of the difference (the determinative difference) between the calculated value of the NOx storage amount and the reference value. However, when the degree of deterioration of the NSR catalyst 6 is relatively small, the determinative difference is small. Since the reference amount changes depending on the temperature of the NSR catalyst 6 (catalyst temperature) and the flow rate of the exhaust gas flowing into the NSR catalyst 6 (inflowing exhaust gas), it is estimated during the operation of the internal combustion engine 1. However, the estimated value of the reference amount may have an estimation error. Therefore, when the determinative difference is small, the ratio of the estimation error of the reference amount on the determinative difference is relatively large. Then, it may be difficult in some cases to determine that the NSR catalyst 6 is abnormal only on the basis of the calculated value of the NOx storage amount, when the degree of deterioration is relatively small yet. The abnormality diagnosis of the NSR catalyst 6 according to this embodiment is based on the fact that repetitive supply of fuel at regular intervals to the NSR catalyst 6 in a specific start condition that will be described later causes a difference in the mode of outflow of NOx from the NSR catalyst 6 between when the NSR catalyst 6 is normal and when the NSR catalyst 6 is abnormal.

In this embodiment, to perform abnormality diagnosis of the NSR catalyst 6, the ECU 10 performs a specific fuel addition process when the NSR catalyst 6 is in a specific start condition that will be described later. The specific fuel addition is the process of adding fuel through the fuel addition valve 7 repeatedly at a specific cycle. FIG. 2 is a time chart showing changes with time of the timing of fuel addition, the air-fuel ratio A/Fin of the inflowing exhaust gas, and the catalyst temperature Tc when the specific fuel addition process according to the present disclosure is performed.

As shown in FIG. 2, when the specific fuel addition process is performed, the air-fuel ratio A/Fin of the inflowing exhaust gas decreases depending on the cycle of fuel addition through the fuel addition valve 7. The quantity of fuel added by each fuel addition and the specific cycle are set in such a way that the decreased air-fuel ratio A/Fin of the inflowing exhaust gas is made richer than the stoichiometric air-fuel ratio and the average of the air-fuel ratio A/Fin of the inflowing exhaust gas during the performance of the specific fuel addition process is kept leaner than the stoichiometric air-fuel ratio. While the specific fuel addition process is performed, the catalyst temperature Tc rises gradually due to the oxidation reaction of fuel in the NSR catalyst 6. In consequence, the catalyst temperature Tc becomes higher than a threshold temperature Tcx described below.

Relationship between the temperature of the NSR catalyst 6 (or the catalyst temperature) and the saturated NOx storage amount of the NSR catalyst 6 will be described with reference to FIG. 3. In FIG. 3, the horizontal axis represents the temperature of the NSR catalyst 6, and the vertical axis represents the saturated NOx storage amount. In FIG. 3, line L1 represents relationship between them when the NSR catalyst 6 is normal, and line L2 represents relationship when the NSR catalyst 6 is abnormal. As shown in FIG. 3, the saturated NOx storage amount decreases abruptly when the temperature of the NSR catalyst 6 exceeds temperature Tcx. Above temperature Tcx, thermal desorption of NOx is apt to occur, which is desorption of NOx from the NSR catalyst 6 caused by the decrease in the saturated NOx storage amount, which correlates with the temperature of the NSR catalyst 6.

Referring back to FIG. 2, the average of the air-fuel ratio A/Fin of the inflowing exhaust gas during the specific fuel addition process is kept leaner than the stoichiometric air-fuel ratio, as described above. Therefore, if thermal desorption occurs during the specific fuel addition process, the quantity of reducing agent (that is, fuel) supplied is insufficient relative to the quantity of desorbed NOx, so that a portion of desorbed NOx is not reduced and flows out of the NSR catalyst 6. As described above with reference to FIG. 3, thermal desorption is apt to occur when the catalyst temperature Tc is higher than temperature Tcx. Therefore, when the catalyst temperature Tc exceeds temperature Tcx during the specific fuel addition process, a portion of thermally desorbed NOx tends to flow out of the NSR catalyst 6. This can occur even if the NSR catalyst 6 is normal. The temperature above which NOx can flow out of the NSR catalyst 6 during the specific fuel addition process even if the NSR catalyst 6 is normal will be referred to as the "thermal desorption temperature Tcx". As shown in the graph showing the change with time of the catalyst temperature Tc in FIG. 2, the specific fuel addition process causes the catalyst temperature Tc to exceed the thermal desorption temperature Tcx.

As described above, during the specific fuel addition process, there are periods in which the air-fuel ratio A/Fin of the inflowing exhaust gas is richer than the stoichiometric air-fuel ratio. In such periods, a portion of the NOx stored in the NSR catalyst 6 is desorbed from the NSR catalyst 6. We focused on the fact that the mode of outflow of the thus desorbed NOx from the NSR catalyst 6 differs between when the NSR catalyst 6 is normal and when it is abnormal, which will be described in the following specifically.

FIGS. 4 and 5 are time charts that illustrate how the NOx concentration Rnoxout of the outflowing exhaust gas changes with time in cases where the specific fuel addition process is performed when the NSR catalyst 6 is in a specific start condition. FIG. 4 shows a case where the NSR catalyst 6 is normal, and FIG. 5 shows a case where the NSR catalyst is abnormal. The changes with time of the NOx concentration Rnoxout of the outflowing exhaust gas shown in FIGS. 4 and 5 are merely examples. In FIGS. 4 and 5, fuel addition through the fuel addition valve 7 is not performed during the period until time t1. During this period, the NSR catalyst 6 stores NOx. At time t1, the specific fuel addition process is started.

The specific start condition refers to a condition in which the NOx storage amount in the NSR catalyst 6 calculated by the ECU 10 falls in a specific range (which will be specifically described later) and the temperature of the NSR catalyst 6 (catalyst temperature) is equal to or lower than a specific temperature lower than the thermal desorption temperature and equal to or higher than the activation temperature of the NSR catalyst 6. In FIGS. 4 and 5, the catalyst temperature Tc at time t1 at which the specific fuel addition process is started is Tc0. This temperature Tc0 is equal to or lower than a specific temperature Tcth, which is lower than the thermal desorption temperature Tcx, and equal to or higher than the activation temperature Tca of the NSR catalyst 6.

As shown in FIG. 4, during the NOx storage period until time t1, NOx in the exhaust gas is stored into the NSR catalyst 6 almost entirely. Consequently, the NOx concentration Rnoxout of the outflowing exhaust gas is substantially equal to zero. After the specific fuel addition process is started at time t1, the catalyst temperature Tc gradually rises and eventually reaches the thermal desorption temperature Tcx at time t2. When the NSR catalyst 6 is normal, the NOx concentration Rnoxout of the outflowing exhaust gas is substantially equal to zero during the period Δt from time t1 at which the specific fuel addition process is started to time t2 at which the catalyst temperature Tc reaches the thermal desorption temperature Tcx. This means that NOx scarcely flows out of the NSR catalyst 6 during this period Δt. In this embodiment, this period Δt corresponds to the specific period according to the present disclosure. In the following, this period Δt will also be referred to as the specific period Δt. However, the specific period according to the present disclosure is not limited to this period Δt, but it may be any period having a duration long enough to enable calculation of the quantity of NOx flowing out of the NSR catalyst 6 during that period. After time t2, the NOx concentration Rnoxout in the outflowing exhaust gas increases with rises of the catalyst temperature Tc exceeding the thermal desorption temperature Tcx. The NOx concentration Rnoxout in the outflowing exhaust gas reaches a certain peak and then starts to decrease. The reason why NOx flows out of the NSR catalyst 6 when the catalyst temperature Tc is equal to or higher than the thermal desorption temperature Tcx is that a portion of thermally desorbed NOx flows out of the NSR catalyst 6 without being reduced, as described above.

On the other hand, when the NSR catalyst is abnormal, as shown in FIG. 5, the NOx concentration Rnoxout of the outflowing exhaust gas starts to increase after the lapse of a certain delay time since the start of the specific fuel addition process at time t1. The NOx concentration Rnoxout in the outflowing exhaust gas reaches a certain peak and then starts to decrease. The NOx concentration Rnoxout in the outflowing exhaust gas decreases to become substantially equal to zero before time t2 at which the catalyst temperature Tc reaches the thermal desorption temperature Tcx. This means that NOx flows out of the NSR catalyst 6 during the specific period Δt. This is because a portion of NOx desorbed from the NSR catalyst 6 during the periods in which the air-fuel ratio A/Fin of the inflowing exhaust gas is richer than the stoichiometric air-fuel ratio flows out of the NSR catalyst 6 without being reduced by the reducing agent (or fuel). The outflow from the NSR catalyst 6 of a portion of desorbed NOx that is not reduced by the reducing agent (or fuel) is influenced by deterioration of noble metal catalyst supported on the catalyst carrier in the NSR catalyst 6. If deteriorated, the noble metal catalyst cannot exercise its catalyst effect satisfactorily. Therefore, if the NSR catalyst 6 is in an abnormal condition in which the noble metal catalyst is deteriorated, a portion of desorbed NOx is hardly reduced by the reducing agent (or fuel) and tend to flow out of the NSR catalyst.

As described above, when the specific fuel addition process is performed with the NSR catalyst 6 in the specific start condition, while NOx scarcely flows out of the NSR catalyst 6 during the specific period Δt in the case where the NSR catalyst 6 is normal, NOx flows out of the NSR catalyst 6 during the specific period Δt in the case where the NSR catalyst 6 is abnormal. Therefore, diagnosis as to abnormality of the NSR catalyst 6 can be made on the basis of the outflowing NOx quantity in the above-described circumstance, namely the quantity of outflowing NOx during the specific period Δt in the specific fuel addition process. This outflowing NOx quantity will also be referred to as the "diagnostic outflow quantity" hereinafter.

If the specific fuel addition process is started when the catalyst temperature Tc is higher than the specific temperature Tcth, the difference between the catalyst temperature Tc and the thermal desorption temperature Tcx is small at the time when the specific fuel addition process is started, and the period Δt shown in FIGS. 4 and 5 tends to be short. If the period Δt is short, it is difficult to distinguish NOx flowing out of the NSR catalyst 6 during the specific period (the sum total of which is the diagnostic outflow quantity) and NOx flowing out of the NSR catalyst 6 after the lapse of the period Δt (that is, thermally desorbed NOx). Then, it is difficult to calculate the diagnostic outflow quantity accurately. To avoid this, in this embodiment, the specific fuel addition process is started when the catalyst temperature Tc is equal to or lower than the specific temperature Tcth and equal to or higher than the activation temperature Tca of the NSR catalyst 6.

When fuel is added periodically by the fuel addition valve 7, if the inflowing exhaust gas is made too rich by the addition of fuel, or if the period over which the air-fuel ratio of the inflowing exhaust gas is too long, the rate of temperature rise of the NSR catalyst 6 will be too high. In this case also, the period Δt shown in FIGS. 4 and 5 tends to be short, making it difficult to accurately calculate the diagnostic outflow quantity. Moreover, if a sufficient quantity of reducing agent (or fuel) is present relative to the quantity of desorbed NOx, the most part of the desorbed NOx will be reduced, and the downstream NOx sensor 15 cannot sense the desorbed NOx in some cases. To avoid such situations, it is necessary to perform the above-described specific fuel addition process when performing the abnormality diagnosis of the NSR catalyst 6.

The present inventors have discovered that if the specific fuel addition process is performed when the NOx storage amount in the NSR catalyst 6 calculated by the ECU 10 falls in a specific range, the NOx concentration Rnoxout of the outflowing exhaust gas changes during the specific period Δt in the manner shown in FIG. 4 in the case where the NSR catalyst 6 is normal and in the manner shown in FIG. 5 in the case where the NSR catalyst 6 is abnormal. This will be specifically described in the following with reference to FIG. 6.

FIG. 6 is a graph showing relationship between the NOx storage amount in the NSR catalyst 6 and the quantity of NOx flowing out of the NSR catalyst 6. In FIG. 6, the horizontal axis represents the NOx storage amount in the NSR catalyst 6 at the time when the specific fuel addition process is started. The NOx storage amount at that time will also be referred to as the "start storage amount" hereinafter. The vertical axis in FIG. 6 represents the quantity of outflowing NOx during the specific period in the specific fuel addition process (namely, the diagnostic outflow quantity). In FIG. 6, line L3 represents relationship between them when the NSR catalyst 6 is normal, and line L4 represents relationship when the NSR catalyst 6 is abnormal and the degree of deterioration thereof is relatively small. In FIG. 6, Qnoxmin is the lower bound of the specific range, and Qnoxmax is the upper bound of the specific range.

As shown by line L3 in FIG. 6, if the NSR catalyst 6 is normal, the diagnostic outflow quantity is very small when the start storage amount falls within the specific range, namely when the start storage amount is equal to or larger than the lower bound Qnoxmin of the specific range and equal to or smaller than the upper bound Qnoxmax of the specific range. On the other hand, as shown by line L4 in FIG. 6, when the NSR catalyst 6 is abnormal, the diagnostic outflow quantity is relatively large in the specific range, even if the degree of deterioration of the NSR catalyst 6 is relatively small yet. The inventors have discovered that when the start storage amount falls within the specific range (which is one of the conditions required to establish the aforementioned specific start condition), the diagnostic outflow quantity differs between the NSR catalyst 6 in a normal condition and that in an abnormal condition. Therefore, by performing abnormality diagnosis of the NSR catalyst 6 on the basis of this diagnostic outflow quantity, it is possible to diagnose abnormality of the NSR catalyst 6 with a relatively small degree of deterioration that is difficult to diagnose by the technologies described in the prior art literatures.

The ECU 10, which serves as the abnormality diagnosis apparatus for exhaust gas purification apparatus according to the present disclosure, starts the specific fuel addition process at a time when the NSR catalyst 6 is in the specific start condition (specifically, the catalyst temperature Tc is equal to or lower than the specific temperature Tcth and equal to or higher than the activation temperature Tca, and the NOx storage amount falls within the specific range), as described above. Moreover, the ECU diagnoses the NSR catalyst 6 on the basis of the quantity of outflowing NOx during the specific period $\Delta t$ (or the diagnostic outflow quantity). Thus, it is possible to diagnose the NSR catalyst 6 as abnormal even when the degree of deterioration of the NSR catalyst 6 is relatively small yet.

(Flow of Abnormality Diagnosis)

A control flow executed by the ECU 10, which serves as the abnormality diagnosis apparatus for exhaust gas purification apparatus according to the present disclosure, will be described with reference to FIG. 7. FIG. 7 is a flow chart of the control flow according to this embodiment. In this embodiment, this flow is executed by the ECU 10 repeatedly at predetermined calculation intervals during the operation of the internal combustion engine 1. Calculation of the storage amount Qnox defined as the amount of NOx stored in the NSR catalyst 6 is also performed by the ECU 10 repeatedly at predetermined calculation intervals during the operation of the internal combustion engine 1 by a known flow other than this flow. The storage amount Qnox is calculated by, for example, adding up the inflowing NOx quantity and the outflowing NOx quantity.

In this flow, firstly in step S101, it is determined whether or not the condition for performing abnormality diagnosis of the NSR catalyst 6 is met. In step S101, for example, if it can be determined that the downstream NOx sensor 15 functions normally, the condition for performing abnormality diagnosis of the NSR catalyst 6 is considered to be met, and an affirmative determination is made. Moreover, for example, if the NOx purge process of purging NOx stored in the NSR catalyst 6 has been completed, the condition for performing abnormality diagnosis of the NSR catalyst 6 is considered to be met, and an affirmative determination is made. Alternatively, for example, the storage amount Qnox calculated by a known flow other than this flow is sufficiently small, the condition for performing abnormality diagnosis of the NSR catalyst 6 is considered to be met without regard to the NOx purge process, and an affirmative determination is made. If an affirmative determination is made in step S101, the ECU 10 executes the processing of step S102 next. If a negative determination is made in step S101, the execution of this flow is terminated.

If an affirmative determination is made in step S101, then in step S102, the NOx storage amount in the NSR catalyst 6 (i.e. the storage amount Qnox) and the temperature of the NSR catalyst 6 (i.e. the catalyst temperature Tc) are acquired. In step S102, the storage amount Qnox that has been calculated by a known flow other than this flow and stored in a RAM of the ECU 10 is read. The catalyst temperature Tc is calculated from the output value of the temperature sensor 16.

Then, in step S103, it is determined whether or not the storage amount Qnox acquired in step S102 is equal to or larger than the lower bound Qnoxmin of the specific range. The lower bound Qnoxmin of the specific range is stored in the ROM of the ECU 10. If an affirmative determination is made in step S103, the ECU 10 executes the processing of step S104 next. If a negative determination is made in step S103, the ECU 10 returns to the processing of step S102.

If an affirmative determination is made in step S103, then in step S104, it is determined whether or not the storage amount Qnox read in step S102 is equal to or smaller than the upper bound Qnoxmax of the specific range. The upper bound Qnoxmax of the specific range is stored in the ROM of the ECU 10. If an affirmative determination is made in step S104, the storage amount Qnox falls within the specific range (which is one of the conditions required to establish the aforementioned specific start condition), and then the ECU 10 executes the processing of step S105 next. If a negative determination is made in step S104, the execution of this flow is terminated.

If an affirmative determination is made in step S104, then in step S105, it is determined whether or not the catalyst temperature Tc calculated in step S102 is equal to or higher than the activation temperature Tca of the NSR catalyst 6 and equal to or lower than the specific temperature Tcth. As described above, the specific temperature Tcth is a temperature that is lower than the thermal desorption temperature Tcx and has a difference from the thermal desorption temperature Tcx large enough to enable accurate calculation of the diagnostic outflow quantity. The activation temperature Tca and the specific temperature Tcth are stored in the ROM of the ECU 10. If affirmative determination is made in step S105, the NSR catalyst 6 is in the specific start condition, and then the ECU 10 executes the processing of step S106 next. If a negative determination is made in step S105, the ECU 10 returns to the processing of step S102. If the storage amount Qnox exceeds the upper bound Qnoxmax of the specific range due to increase in the NOx storage amount in the NSR catalyst 6 while the processing of steps S102 to S105 is repeatedly executed because of a negative determination made in step S105, a negative determination is made in step S104, and the execution of this flow is terminated. In that case, abnormality diagnosis of the NSR catalyst 6 is not performed in this execution of the flow.

If an affirmative determination is made in step S105, then in step S106, the specific fuel addition process is started. After the specific fuel addition process is started, then in step S107, the current value of the quantity of NOx flowing out of the NSR catalyst 6 (which will be also referred to as the "current outflow quantity Qoutnow") is acquired from the measurement values of the air flow meter 4 and the downstream NOx sensor 15. Then, the outflowing NOx quantity Qnoxout defined as the quantity of NOx flowing out of the NSR catalyst 6 is calculated by integrating the current outflow quantity Qoutnow thus acquired. Then, in step S108, the catalyst temperature Tc is acquired. The processing of step S108 is substantially the same as the processing of acquiring the catalyst temperature Tc in step S102 described above. Then, in step S109, it is determined whether or not the catalyst temperature Tc acquired in step S108 is equal to or higher than the thermal desorption temperature Tcx. The thermal desorption temperature Tcx, which has also been described, is stored in the ROM of the ECU 10. If an affirmative determination is made in step S109, then it means that the specific period Δt shown in FIGS. 4 and 5 has elapsed. Then, the ECU 10 executes the processing of step S110 next. On the other hand, if a negative determination is made in step S109, the ECU 10 returns to the processing of step S107. By executing the processing of steps S106 to S109, the ECU 10 calculates the outflowing NOx quantity Qnoxout as the quantity of NOx flowing out of the NSR catalyst 6 during the period from when the specific fuel addition process is started to when the catalyst temperature Tc reaches the thermal desorption temperature Tcx.

If an affirmative determination is made in step S109, then in step S110, the specific fuel addition process is ended. Then, in step S111, it is determined whether or not the outflowing NOx quantity Qnoxout calculated in step S107 is smaller than a predetermined threshold Qth. The predetermined threshold Qth is a threshold for making a determination as to whether or not the NSR catalyst 6 has an abnormality. The predetermined threshold Qth is stored in the ROM of the ECU 10. If an affirmative determination is made in step S111, then it is diagnosed in step S112 that the NSR catalyst 6 is normal. After the completion of the processing of step S112, the execution of this flow is ended. If a negative determination is made in step S111, then it is diagnosed in step S113 that the NSR catalyst 6 is abnormal. After the completion of the processing of step S113, the execution of this flow is ended.

By executing the above-described control flow by the ECU 10, which serves as the abnormality diagnosis apparatus for an exhaust gas purification apparatus according to the present disclosure, it is possible to diagnose the NSR catalyst 6 as abnormal, even when the degree of deterioration of the NSR catalyst 6 is relatively small yet.

In this embodiment, the ECU 10 constitutes the controller according to the present disclosure in calculating the outflowing NOx quantity, the NOx storage amount in the NSR catalyst 6 and performing the specific fuel addition control using the fuel addition valve 7. Furthermore, the ECU 10 functions as the controller according to the present disclosure in executing the processing of steps S111 to S113 in the control flow shown in FIG. 7.

Next, the above-described control flow will be described using a time chart briefly. FIG. 8 is a time chart showing changes with time of the air-fuel ratio A/Fin of the inflowing exhaust gas, the catalyst temperature Tc, the storage amount Qnox, a diagnosis flag flagd, and a start flag flaga. The diagnosis flag flagd is a flag that indicates the establishment of the condition for performing abnormality diagnosis of the NSR catalyst 6. The start flag flaga is a flag that indicates whether or not the NSR catalyst 6 is in the specific start condition. In FIG. 8, the period until time t11 is an NOx purge period in which the process of purging NOx stored in the NSR catalyst 6 (or NOx purging process) is performed. The NOx purge process makes the catalyst temperature Tc relatively high to thereby make the storage amount Qnox substantially equal to zero at time t11.

As shown in FIG. 8, at time t11 at which the NOx purge process is completed, the diagnosis flag flagd is set, and the condition for performing abnormality diagnosis of the NSR catalyst 6 is met. This situation corresponds to the case where an affirmative determination is made in the processing of step S101 in the above-described control flow shown in FIG. 7. After time t11, the processing of steps S102 to S105 in the control flow shown in FIG. 7 is executed. In the time chart shown in FIG. 8, the storage amount Qnox scarcely increases until time t12 at which the catalyst temperature Tc exceeds the thermal desorption temperature Tcx. After time t12, the storage amount Qnox increases gradually.

At time t1 at which the storage amount Qnox reaches the lower bound Qnoxmin of the specific range, the start flag flaga is set. At time t1, the storage amount Qnox is equal to or larger than the lower bound Qnoxmin of the specific range and equal to or smaller than the upper bound Qnoxmax of the specific range (namely falls within the specific range). Therefore, an affirmative determination is made in the processing of steps S103 and S104 in FIG. 7. Moreover, at time t1, the catalyst temperature Tc is equal to or higher than the activation temperature Tca and equal to or lower than the specific temperature Tcth. Therefore, an affirmative determination is made in the processing of step S105 in FIG. 7. Thus, the NSR catalyst 6 is in the specific start condition, and therefore the start flag flaga is set, as described above. As the start flag flaga is set, the specific fuel addition process is started (which corresponds to the processing of step S106 in FIG. 7). While the specific fuel addition process is being performed, the outflowing NOx quantity Qnoxout is calculated by integrating the current outflow quantity Qoutnow (which corresponds to the processing of step S107 in FIG. 7).

The catalyst temperature Tc increases with the specific fuel addition process and reaches the thermal desorption temperature Tcx at time t2 (which corresponds to the case where an affirmative determination is made in the processing of step S109 in FIG. 7). At that time t2, the specific fuel addition process is terminated (which corresponds to the processing of step S110 in FIG. 7). Then, abnormality diagnosis of the NSR catalyst 6 is performed on the basis of the calculated value of the outflowing NOx quantity Qnoxout (which corresponds to the processing of steps S111 to S113 in FIG. 7). After the completion of abnormality diagnosis of the NSR catalyst 6, the diagnosis flag flagd is cleared.

<First Modification of First Embodiment>

A first modification of the above-described first embodiment will be described with reference to FIG. 9. In the description of this modification, the components and processing substantially the same as those in the above described first embodiment will not be described in further detail.

FIG. 9 is a flow chart of the control flow according to the first modification. In this modification, this control flow is executed by the ECU 10 repeatedly at predetermined calculation intervals during the operation of the internal combustion engine 1.

In the flow shown in FIG. 9, after the completion of the processing of step S105, the processing of step S205 is executed, where a specific period tcr is calculated. The specific period tcr is substantially the same in its concept as the specific period described in the first embodiment. It should be understood that the specific period tcr in this modification is not limited to the period Δt shown in FIGS.

4, 5, and 8. In step S205, the specific period tcr is calculated, for example, from the catalyst temperature Tc, the storage amount Qnox, and the flow rate of the exhaust gas discharged from the internal combustion engine 1 at that time using a map representing these values and the specific period tcr. This way of calculation is merely an example, and the specific period tcr may be calculated by any known method. After the completion of the processing of step S205, the ECU 10 executes the processing of step S106 next.

In the flow shown in FIG. 9, after the completion of the processing of step S107, the processing of step S209 is executed, where it is determined whether the specific period tcr calculated in step S205 has elapsed since the start of the specific fuel addition processing in step S106. If an affirmative determination is made in step S209, the ECU 10 executes the processing of step S110 next. If a negative determination is made in step S209, the ECU 10 returns to the processing of step S107.

By executing the above-described control flow by the ECU 10, which serves as the abnormality diagnosis apparatus for an exhaust gas purification apparatus according to the present disclosure, it is possible to diagnose the NSR catalyst 6 as abnormal, even when the degree of deterioration of the NSR catalyst 6 is relatively small yet.

<Second Modification of First Embodiment>

It is possible to produce reactive intermediates in the NSR catalyst 6 by setting the quantity of fuel added by each fuel addition in the specific fuel addition process (which will also be referred to as "each addition quantity" hereinafter) and the specific cycle of fuel addition in an appropriate range. Consequently, it is possible to reduce NOx by the reactive intermediates produced in this way. In the following, how it can be achieve will be described.

FIGS. 10 and 11 schematically show the surface of the catalyst carrier 50 of the NSR catalyst 6. In FIGS. 10 and 11 are also written reactions that are supposed to occur when the specific fuel addition process is performed with the each addition quantity and the specific cycle set in a range according to this modification. FIG. 10 shows a case where fuel is not supplied to the NSR catalyst 6 by fuel addition through the fuel addition valve 7, namely a case where the air-fuel ratio of the inflowing exhaust gas is a lean air-fuel ratio. On the other hand, FIG. 11 shows a case where fuel added through the fuel injection valve 7 is supplied to the NSR catalyst 6, namely a case where the air-fuel ratio of the inflowing exhaust gas is a rich air-fuel ratio.

The NSR catalyst 6 includes a catalyst carrier 50 made of, for example, alumina and a noble metal catalyst 51 made of platinum Pt supported on the catalyst carrier 50. Moreover, a basic layer 53 is provided on the catalyst carrier 50. The basic layer 53 contains at least one material selected from alkali metals such as potassium K, sodium Na, and cesium Cs, alkali earth metals such as barium Ba and calcium Ca, rare earths such as lanthanides, and metals that can give electrons to NOx such as silver Ag, copper Cu, iron Fe, and iridium Ir. On the catalyst carrier 50 may be supported rhodium Rh or palladium Pd in addition to platinum Pt.

When the air-fuel ratio of the inflowing exhaust gas is lean, as shown in FIG. 10, a portion of NOx in the exhaust gas is oxidized on platinum Pt 51 supported on the catalyst carrier 50 to $NO_2$, which is further oxidized to $NO_3$. A portion of $NO_2$ becomes $NO_2^-$. Thus, $NO_2^-$ and $NO_3$ are produced on platinum Pt. The NO adhering on the NSR catalyst 6 and the $NO_2^-$ and $NO_3$ produced on platinum Pt 51 have high activity. In the following such NO, $NO_2^-$ and $NO_3$ will be referred to as active NOx*.

When fuel added through the fuel addition valve 7 is supplied to the NSR catalyst 6 to make the air-fuel ratio of the inflowing exhaust gas rich, while the greater part of the hydrocarbons HC contained in the fuel is burned by oxidation reaction, a portion of the hydrocarbons HC is reformed into radicals. In consequence, the concentration of hydrocarbons around the active NOx* becomes high as shown in FIG. 11. If a high oxygen concentration around the active NOx* continues longer than a certain length of time after the formation of the active NOx*, the active NOx* is oxidized and absorbed by the basic layer 53 in the form of nitrate ion $NO_3^-$. However, if the concentration of hydrocarbons around the active NOx* is made high again, the active NOx* reacts with radical hydrocarbons HC on the platinum Pt 51 to produce reductive intermediates as shown in FIG. 11. The reactive intermediates thus produced adhere to or are adsorbed onto the surface of the basic layer 53.

The reactive intermediate that is produced firstly is considered to be a nitro compound R—$NO_2$. The nitro compound thus produced becomes a nitrile compound R—CN, which can exist as it is only for a moment and becomes isocyanate compound R—NCO. The isocyanate compound R—NCO is hydrolyzed to produce amine compound R—$NH_2$, but it is considered that hydrolyzed is a portion of the isocyanate compound R—NCO. Thus, the reductive intermediates adhering to or adsorbed on the surface of the basic layer 53 are considered to be isocyanate compound R—NCO and amine compound R—$NH_2$ for the most part, as shown in FIG. 11.

On the other hand, when hydrocarbons HC are adhering around the produced reactive intermediates as shown in FIG. 11, the reactive intermediates are blocked by the hydrocarbons HC, and the reaction does not progress further. In that case, the concentration of hydrocarbons HC in the inflowing exhaust gas decreases, and then the hydrocarbon HC adhering around the reactive intermediates are oxidized to disappear. Thus, when the oxygen concentration around the reactive intermediates becomes high consequently, the reactive intermediates react with NOx and active NOx* in the exhaust gas or with oxygen around them, or autolyze. In consequence, the reactive intermediates such as R—NCO and R—$NH_2$ change into $N_2$, $CO_2$, and $H_2O$. In this way, NOx is reduced by the reactive intermediates.

As described above, in the NSR catalyst 6, reactive intermediates are produced when the concentration of hydrocarbons in the inflowing exhaust gas becomes high. Thereafter, NOx is reduced by the reductive intermediates when the concentration of hydrocarbons in the inflowing exhaust gas decreases and the concentration of oxygen becomes high. Therefore, to produce the reactive intermediates in the NSR catalyst and reduce NOx by the reactive intermediates, it is necessary to change the concentration of hydrocarbons in the inflowing exhaust gas cyclically.

In the above process, moreover, it is necessary to raise the concentration of hydrocarbons in the inflowing exhaust gas high enough to produce the reactive intermediates and necessary to decrease the concentration of hydrocarbons low enough to cause the produced reactive intermediates to react with NOx and active NOx* in the exhaust gas or autolyze. When the cycle time of the supply of hydrocarbons HC is long, the period over which the oxygen concentration is high during the time after the supply of hydrocarbons HC until the next supply of hydrocarbons HC is long. Then, in consequence, active NOx* will be absorbed into the basic layer 53 in the form of nitrate without producing reactive intermediates. To reduce NOx by the reactive intermediates, it is necessary to change the air-fuel ratio of the inflowing exhaust gas with an appropriate magnitude and cycle. In this modification, the each addition quantity and the specific cycle in the specific fuel addition process are set in such a way that the air-fuel ratio of the inflowing exhaust gas changes with an appropriate magnitude and cycle.

In this modification, moreover, the each addition quantity and the specific cycle in the specific fuel addition process are set so that the quantity of reactive intermediates produced to reduce NOx is commensurate with the quantity of NOx flowing into the NSR catalyst 6 per unit time during the specific fuel addition process. When reactive intermediates are produced in the NSR catalyst 6 by the specific fuel addition process, the larger the each addition quantity in the specific fuel addition process is, the larger the quantity of the produced reactive intermediates is. Moreover, the shorter the cycle time of fuel addition in the specific fuel addition process is, the larger the quantity of the produced reactive intermediates is. Therefore, the relationship of the each addition quantity and the specific cycle in the specific fuel addition process with the quantity of reactive intermediates produced by the specific fuel addition process is determined in advance by, for example, experiment and stored in the ECU 10 as a map or function. The ECU 10 sets the each addition quantity and the specific cycle in the specific fuel addition process using this map or function.

As above, it is possible to reduce the NOx that newly flows into the NSR catalyst 6 with the exhaust gas during the specific fuel addition process by the reactive intermediates by performing the specific fuel addition process in such a way that the quantity of reactive intermediates produced is commensurate with the quantity of NOx flowing into the NSR catalyst 6 per unit time during the specific fuel addition process. In consequence, it is possible to prevent the NOx that newly flows into the NSR catalyst 6 from passing through and flowing out of the NSR catalyst 6 to be detected by the downstream NOx sensor 15. Thus, it is possible to prevent, as much as possible, NOx other than the NOx desorbed from the NSR catalyst 6 by the performance of the specific fuel addition process (namely, NOx that flows newly into the NSR catalyst 6 with the exhaust gas during the specific fuel addition process) from being included in the quantity of outflowing NOx calculated during the specific fuel addition process. Therefore, it is possible to further improve the accuracy of abnormality diagnosis of the NSR catalyst 6 based on the outflowing NOx quantity during the specific period in the specific fuel addition process (namely the diagnostic outflow quantity).

<Second Embodiment>

A second embodiment of the present disclosure will be described with reference to FIGS. 12, 13A, 13B, and 13C. In the description of the second embodiment, the components and processing substantially the same as those in the above described first embodiment will not be described in further detail.

FIG. 12 is a flow chart of a control flow according to the second embodiment. In the second embodiment, this control flow is executed by the ECU 10 repeatedly at predetermined calculation intervals during the operation of the internal combustion engine 1.

In the flow shown in FIG. 12, if an affirmative determination is made in step S101, then in step S301, a normal storage amount Qnoxnrm is estimated, which is the amount of NOx stored in the NSR catalyst 6 that is in a standard normal condition. The NSR catalyst 6 in a standard normal condition refers to an NSR catalyst 6 that is in a specific deteriorated condition in which the NSR catalyst 6 is regarded as normal, that is, for example an NSR catalyst 6 that is deteriorated to a degree small enough to keep the emissions below a limit set by regulations. In step S301, the normal storage amount Qnoxnrm is estimated according to the operation state of the internal combustion engine 1 from, for example, the quantity of NOx flowing into the NSR catalyst 6 per unit time, the catalyst temperature Tc, and the flow rate of the exhaust gas discharged from the internal combustion engine 1. This method of estimation is merely an example, and the normal storage amount Qnoxnrm may be estimated by other known method.

Then, in step S302, it is determined whether or not the normal storage amount Qnoxnrm is equal to or larger than the lower bound Qnoxmin of the specific range. If an affirmative determination is made in step S302, the ECU 10 executes the processing of step S303 next. If a negative determination is made in step S302, the ECU 10 returns to the processing of step S301.

If an affirmative determination is made in step S302, then in step S303, the storage amount Qnox is acquired. The processing of step S303 is substantially the same as the processing of acquiring the storage amount Qnox in step S102 in the control flow shown in FIG. 7. In step S304, it is determined whether or not the storage amount Qnox acquired in step S303 is smaller than the normal storage amount Qnoxnrm estimated in step S301. If an affirmative determination is made in step S304, the ECU 10 executes the processing of step S305 next. If a negative determination is made in step S304, the NSR catalyst 6 is diagnosed as normal in step S306. After the completion of the processing of step S306, the execution of this flow is ended. Thus, the NSR catalyst 6 can be diagnosed as abnormal as soon as possible without performing the specific fuel addition process.

In an affirmative determination is made in step S304, then in step S305, it is determined whether or not the storage amount Qnox acquired in step S303 is larger than an abnormal storage amount Qnoxabn. The abnormal storage amount Qnoxabn is an amount smaller than the lower bound Qnoxmin of the specific range. If the storage amount Qnox is equal to or smaller than the abnormal storage amount Qnoxabn, it is determined that the degree of deterioration of the NSR catalyst 6 is relatively large. The abnormal storage amount Qnoxabn may be either predetermined and stored in the ROM of the ECU 10 or determined according to the operation state of the internal combustion engine 1. For example, the abnormal storage amount Qnoxabn is set on the basis of the normal storage amount Qnoxnrm that is estimated according to the operation state of the internal combustion engine 1. More specifically, the abnormal storage amount Qnoxabn is set to a value smaller than the lower bound of a range that represents the normal storage amount Qnoxnrm determined taking account of possible errors in its estimation and other factors. If an affirmative determination is made in step S305, the ECU 10 executes the processing of step S102 next. On the other hand, if a negative determination is made in step S305, the NSR catalyst 6 is diagnosed as abnormal in step S307. After the completion of the processing of step S307, the execution of this flow is ended.

As above, it is possible to diagnose the NSR catalyst as abnormal even before starting the specific fuel addition process. Therefore, if the degree of deterioration of the NSR catalyst 6 is relatively large, the abnormality thereof can be diagnosed as soon as possible without performing the specific fuel addition process. Moreover, even if the degree of deterioration is so large that the amount of NOx stored in the NSR catalyst 6 does not reach the lower bound Qnoxmin of the specific range, it is possible to diagnose the NSR catalyst 6 without performing the specific fuel addition process.

In this embodiment, the ECU 10 constitutes the controller according to the present disclosure in executing the processing of step S301 in the control flow shown in FIG. 12, the processing of steps S111 to S113 in the control flow shown in FIG. 7 and the processing of S304 to S307 in the control flow shown in FIG. 12. The ECU 10 may execute the processing of steps S304 and S306 instead of the processing of steps S304 to S307 in the control flow shown in FIG. 12 and executing the processing of steps S111 to S113 in the control flow shown in FIG. 7 and the processing of steps S304 and S306 in the control flow shown in FIG. 12 to constitute the controller according to the present disclosure. In this case, if an affirmative determination is made in step S304, the ECU 10 executes the processing of step S102 next. Alternatively, the ECU 10 may execute the processing of steps S305 and S307 instead of the processing of steps S304 to S307 in the control flow shown in FIG. 12 and executing the processing of steps S111 to S113 in the control flow shown in FIG. 7 and the processing of steps S305 and S307 in the control flow shown in FIG. 12 to constitute the controller according to the present disclosure. In this case, the processing of step S305 is executed after the processing of step S303.

The above-described control flow will be described using a time chart briefly. FIG. 13A is a time chart showing changes with time of the air-fuel ratio A/Fin of the inflowing exhaust gas, the catalyst temperature Tc, the storage amount Qnox, the diagnosis flag flagd, and the start flag flaga when the NSR catalyst 6 is abnormal with a relatively small degree of deterioration. FIG. 13B is a similar time chart when the NSR catalyst 6 is normal. FIG. 13C is a similar time chart when the NSR catalyst 6 is abnormal with a relatively large degree of deterioration. In the graphs showing the change with time of the storage amount Qnox in FIGS. 13A to 13C, line L5 represents the storage amount Qnox, which is the NOx storage amount in the NSR catalyst 6 calculated by the ECU 10, line L6 represents the normal storage amount Qnoxnrm, and line L7 represents the abnormal storage amount Qnoxabn. Until time t12, the quantities shown in FIGS. 13A to 13C change in the same manner as those in FIG. 8 described above.

As shown in FIGS. 13A to 13C, the normal storage amount Qnoxnrm estimated by the processing of step S301 in the control flow shown in FIG. 12 increases gradually after time t12 and reaches the lower bound Qnoxmin of the specific range at time t13. Then, an affirmative determination is made in the processing of step S302 shown in FIG. 12. Then, the storage amount Qnox at that time is acquired in the processing of step S303 in FIG. 12.

In the case shown in FIG. 13A, the storage amount Qnox acquired at time t13 is smaller than the normal storage amount Qnoxnrm (leading to an affirmative determination in the processing of step S304 in FIG. 12) and larger than the abnormal storage amount Qnoxabn (leading to an affirmative determination in the processing of step S305 in FIG. 12). Therefore, the control process proceeds to the processing of step S102 and its subsequent steps in FIG. 7, and when the storage amount Qnox reaches the lower bound Qnoxmin of the specific range at time t1, the start flag flaga is set and the specific fuel addition process is performed. At time t2 at which the specific fuel addition process is ended, abnormality diagnosis of the NSR catalyst 6 is performed on the basis of the calculated value of the outflowing NOx quantity Qnoxout. After the completion of the abnormality diagnosis of the NSR catalyst 6, the diagnosis flag flagd is cleared. Thus, it is possible to diagnose the NSR catalyst 6 as abnormal even when the degree of deterioration of the NSR catalyst is relatively small yet.

In the case shown in FIG. 13B, the storage amount Qnox acquired at time t13 is larger than the normal storage amount Qnoxnrm (leading to a negative determination in the processing of step S304 in FIG. 12). In consequence, the NSR catalyst 6 is diagnosed as normal at time t13 (which corresponds to the processing of step S306 in FIG. 12), and then the diagnosis flag flagd is cleared. In this case, as shown in FIG. 13B, the start flag flaga is not set, and the specific fuel addition process is not performed. Thus, it is possible to diagnose the NSR catalyst 6 as normal as soon as possible without performing the specific fuel addition process.

In the case shown in FIG. 13C, the storage amount Qnox acquired at time t13 is smaller than the normal storage amount Qnoxnrm (leading to an affirmative determination in the processing of step S304 in FIG. 12) and smaller than the abnormal storage amount Qnoxabn (leading to a negative determination in the processing of step S305 in FIG. 12). In consequence, the NSR catalyst 6 is diagnosed as abnormal at time t13 (which corresponds to the processing of step S307 in FIG. 12), and the diagnosis flag flagd is cleared. In this case, as shown in FIG. 13C, the start flag flaga is not set, and the specific fuel addition process is not performed. Thus, if the degree of deterioration of the NSR catalyst 6 is relatively large, it is possible to diagnose the NSR 6 catalyst as abnormal as normal as soon as possible without performing the specific fuel addition process. Moreover, even if the degree of deterioration is so large that the amount of NOx stored in the NSR catalyst 6 does not reach the lower bound Qnoxmin of the specific range, it is possible to diagnose the NSR catalyst 6 without performing the specific fuel addition process.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An abnormality diagnosis apparatus for an exhaust gas purification apparatus of an internal combustion engine that operates in a lean burn mode, said exhaust gas purification apparatus including an NOx storage reduction catalyst provided in an exhaust passage of said internal combustion engine and a fuel addition valve provided in the exhaust passage upstream of said NOx storage reduction catalyst to add fuel to exhaust gas, comprising a controller comprising at least one processor configured to:

determine an outflowing NOx quantity defined as the quantity of NOx flowing out of said NOx storage reduction catalyst;

determine an NOx storage amount defined as the amount of NOx stored in said NOx storage reduction catalyst on the basis of said outflowing NOx quantity;

perform a specific fuel addition process of adding fuel by said fuel addition valve repeatedly at a specific cycle to raise the temperature of said NOx storage reduction catalyst, the quantity of fuel added by each fuel addition in said specific fuel addition process and said specific cycle being set in such a way that NOx stored in said NOx storage reduction catalyst is desorbed and the average air-fuel ratio of the exhaust gas flowing into said NOx storage reduction catalyst is kept at a lean air-fuel ratio higher than the stoichiometric air-fuel ratio during the time in which said specific fuel addition process is being performed; and make a diagnosis as to whether said NOx storage reduction catalyst is normal or abnormal, wherein said controller is further configured to start said specific fuel addition process when said NOx storage reduction catalyst is in a specific start condition in which said NOx storage amount determined by the controller falls within a specific range and the temperature of said NOx storage reduction catalyst is equal to or lower than a specific temperature that is lower than a thermal desorption temperature defined as a temperature above which NOx can flow out of said NOx storage reduction catalyst when said specific fuel addition process is performed even if said NOx storage reduction catalyst is normal, and equal to or higher than the activation temperature of said NOx storage reduction catalyst, and diagnose said NOx storage reduction catalyst on the basis of said outflowing NOx quantity over a specific period in a period from when said specific fuel addition process is started to when the temperature of said NOx storage reduction catalyst reaches said thermal desorption temperature.

2. An abnormality diagnosis apparatus for an exhaust gas purification apparatus according to claim 1, wherein said controller is further configured to perform said specific fuel addition process while setting the quantity of fuel added by each fuel addition in said specific fuel addition process and said specific cycle within a range of fuel addition quantity and cycle in which a reductive intermediate is produced with supply of fuel to said NOx storage reduction catalyst so that the quantity of said reductive intermediate produced is commensurate with the quantity of NOx flowing into said NOx storage reduction catalyst per unit time during the performance of said specific fuel addition process.

3. An abnormality diagnosis apparatus for an exhaust gas purification apparatus according to claim 1, wherein said controller is further configured to:

estimate a normal storage amount defined as the amount of NOx stored in said NOx storage reduction catalyst in a standard normal condition;

start said specific fuel addition process when said NOx storage reduction catalyst is in said specific start condition, said normal storage amount is equal to or larger than the lower bound of said specific range, and said NOx storage amount determined by the controller is smaller than said normal storage amount; and diagnose said NOx storage reduction catalyst as normal without performing said specific fuel addition process, if said NOx storage amount determined by the controller is equal to or larger than said normal storage amount when said normal storage amount is equal to or larger than the lower bound of said specific range.

4. An abnormality diagnosis apparatus for an exhaust gas purification apparatus according to claim 3, wherein said controller is further configured to perform said specific fuel addition process while setting the quantity of fuel added by each fuel addition in said specific fuel addition process and said specific cycle within a range of fuel addition quantity and cycle in which a reductive intermediate is produced with supply of fuel to said NOx storage reduction catalyst so that the quantity of said reductive intermediate produced is commensurate with the quantity of NOx flowing into said NOx storage reduction catalyst per unit time during the performance of said specific fuel addition process.

5. An abnormality diagnosis apparatus for an exhaust gas purification apparatus according to claim 1, wherein said controller is further configured to estimate a normal storage amount defined as the amount of NOx stored in said NOx storage reduction catalyst in a standard normal condition, and diagnose said NOx storage reduction catalyst as abnormal without performing said specific fuel addition process, if said NOx storage amount determined by the controller is equal to or smaller than a specific abnormal storage amount that is smaller than the lower bound of said specific range when said normal storage amount is equal to or larger than the lower bound of said specific range.

6. An abnormality diagnosis apparatus for an exhaust gas purification apparatus according to claim 5, wherein said controller is further configured to perform said specific fuel addition process while setting the quantity of fuel added by each fuel addition in said specific fuel addition process and said specific cycle within a range of fuel addition quantity and cycle in which a reductive intermediate is produced with supply of fuel to said NOx storage reduction catalyst so that the quantity of said reductive intermediate produced is commensurate with the quantity of NOx flowing into said NOx storage reduction catalyst per unit time during the performance of said specific fuel addition process.

7. An abnormality diagnosis apparatus for an exhaust gas purification apparatus according to claim 5, wherein said controller is further configured to start said specific fuel addition process when said NOx storage reduction catalyst is in said specific start condition, said normal storage amount is equal to or larger than the lower bound of said specific range, and said NOx storage amount determined by the controller is smaller than said normal storage amount, and diagnose said NOx storage reduction catalyst as normal without performing said specific fuel addition process, if said NOx storage amount determined by the controller is equal to or larger than said normal storage amount when said normal storage amount is equal to or larger than the lower bound of said specific range.

8. An abnormality diagnosis apparatus for an exhaust gas purification apparatus according to claim 7, wherein said controller is further configured to perform said specific fuel addition process while setting the quantity of fuel added by each fuel addition in said specific fuel addition process and said specific cycle within a range of fuel addition quantity and cycle in which a reductive intermediate is produced with supply of fuel to said NOx storage reduction catalyst so that the quantity of said reductive intermediate produced is commensurate with the quantity of NOx flowing into said NOx storage reduction catalyst per unit time during the performance of said specific fuel addition process.

* * * * *